(12) United States Patent
Ma et al.

(10) Patent No.: US 8,930,200 B2
(45) Date of Patent: Jan. 6, 2015

(54) VECTOR JOINT ENCODING/DECODING METHOD AND VECTOR JOINT ENCODER/DECODER

(71) Applicant: Huawei Technologies Co., Ltd., Shenzhen, Guangdong (CN)

(72) Inventors: Fuwei Ma, Shenzhen (CN); Dejun Zhang, Beijing (CN); Lei Miao, Beijing (CN); Fengyan Qi, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 13/950,018

(22) Filed: Jul. 24, 2013

(65) Prior Publication Data

US 2013/0317810 A1 Nov. 28, 2013

Related U.S. Application Data

(63) Continuation of application No. PCT/CN2011/083237, filed on Nov. 30, 2011.

(30) Foreign Application Priority Data

Jan. 26, 2011 (CN) .......................... 2011 1 0028694

(51) Int. Cl.
| | | |
|---|---|---|
| G10L 19/00 | (2013.01) | |
| G10L 21/00 | (2013.01) | |
| G10L 13/00 | (2006.01) | |
| G10L 19/04 | (2013.01) | |
| G10L 19/038 | (2013.01) | |
| G10L 19/107 | (2013.01) | |

(52) U.S. Cl.
CPC ............... *G10L 19/04* (2013.01); *G10L 19/038* (2013.01); *G10L 19/107* (2013.01); *G10L 2019/0005* (2013.01)
USPC ........... 704/500; 704/501; 704/502; 704/503; 704/504; 704/216; 704/217; 704/219; 704/223; 704/225; 704/229; 704/258; 704/262; 704/263; 704/264

(58) Field of Classification Search
CPC ....... G10L 19/008; G10L 19/00; G10L 19/02; G10L 19/20; G10L 19/005; G10L 19/12; G10L 19/0204; G10L 19/0212; G10L 19/035; G10L 19/167; G10L 19/0017; G10L 19/18; G10L 19/002; G10L 19/032; G10L 19/24; G10L 19/06; G10L 19/08; G10L 19/09; G10L 19/107
USPC ......... 704/500–504, 216, 217, 219, 223, 225, 704/229, 258, 262, 263, 264
See application file for complete search history.

(56) References Cited

U.S. PATENT DOCUMENTS 5,699,482 A * 12/1997 Adoul et al. ................... 704/219
5,701,392 A * 12/1997 Adoul et al. ................... 704/219

(Continued)

FOREIGN PATENT DOCUMENTS

| CN | 1659785 A | 8/2005 |
|---|---|---|
| CN | 101005469 A | 7/2007 |

(Continued)

OTHER PUBLICATIONS

International Search Report in corresponding PCT Patent Application No. PCT/CN2011/083237 (Mar. 8, 2012).

(Continued)

*Primary Examiner* — Edgar Guerra-Erazo
(74) *Attorney, Agent, or Firm* — Huawei Technologies Co., Ltd

(57) ABSTRACT

A vector joint encoding/decoding method and a vector joint encoder/decoder are provided, more than two vectors are jointly encoded, and an encoding index of at least one vector is split and then combined between different vectors, so that encoding idle spaces of different vectors can be recombined, thereby facilitating saving of encoding bits, and because an encoding index of a vector is split and then shorter split indexes are recombined, thereby facilitating reduction of requirements for the bit width of operating parts in encoding/decoding calculation.

23 Claims, 10 Drawing Sheets

(56) References Cited

U.S. PATENT DOCUMENTS

| | | | |
|---|---|---|---|
| 5,717,825 A * | 2/1998 | Lamblin | 704/223 |
| 5,754,976 A * | 5/1998 | Adoul et al. | 704/223 |
| 5,808,572 A | 9/1998 | Yang et al. | |
| 5,893,061 A * | 4/1999 | Gortz | 704/262 |
| 5,924,062 A * | 7/1999 | Maung | 704/219 |
| 6,009,387 A | 12/1999 | Ramaswamy et al. | |
| 6,073,092 A * | 6/2000 | Kwon | 704/219 |
| 6,104,992 A * | 8/2000 | Gao et al. | 704/220 |
| 6,161,086 A * | 12/2000 | Mukherjee et al. | 704/207 |
| 6,275,796 B1 | 8/2001 | Kim et al. | |
| 6,295,520 B1 * | 9/2001 | Tian | 704/223 |
| 6,385,576 B2 * | 5/2002 | Amada et al. | 704/223 |
| 6,728,669 B1 | 4/2004 | Benno | |
| 7,117,146 B2 * | 10/2006 | Gao | 704/200.1 |
| 2001/0053972 A1 * | 12/2001 | Amada et al. | 704/220 |
| 2002/0103638 A1 * | 8/2002 | Gao | 704/207 |
| 2002/0111800 A1 * | 8/2002 | Suzuki et al. | 704/220 |
| 2004/0172402 A1 * | 9/2004 | Jabri et al. | 707/100 |
| 2004/0181400 A1 * | 9/2004 | Kannan et al. | 704/223 |
| 2005/0285764 A1 | 12/2005 | Bessette et al. | |
| 2006/0074641 A1 * | 4/2006 | Goudar et al. | 704/219 |
| 2006/0116872 A1 * | 6/2006 | Byun et al. | 704/222 |
| 2006/0290539 A1 | 12/2006 | Tomic | |
| 2007/0150266 A1 * | 6/2007 | Li et al. | 704/223 |
| 2009/0097565 A1 | 4/2009 | Ma | |
| 2012/0086586 A1 | 4/2012 | Ma et al. | |
| 2013/0021177 A1 | 1/2013 | Ma et al. | |

FOREIGN PATENT DOCUMENTS

| | | |
|---|---|---|
| CN | 101266796 A | 9/2008 |
| CN | 101281750 A | 10/2008 |
| CN | 101295506 A | 10/2008 |
| CN | 101388210 A | 3/2009 |
| CN | 101577721 A | 11/2009 |
| CN | 101931414 A | 12/2010 |
| EP | 1353323 A1 | 10/2003 |
| JP | 02022982 A | 1/1990 |
| JP | 2002108400 A | 4/2002 |
| JP | 2009199048 A | 9/2009 |
| JP | 2010526325 A | 7/2010 |
| WO | WO 2008131352 A1 | 10/2008 |

OTHER PUBLICATIONS

Written Opinion of the International Searching Authority in corresponding PCT Patent Application No. PCT/CN2011/083237 (Mar. 8, 2012).

* cited by examiner

VECTOR JOINT ENCODING/DECODING METHOD AND VECTOR JOINT ENCODER/DECODER

CROSS-REFERENCE TO RELATED APPLICATIONS

This application is a continuation of International Patent Application No. PCT/CN2011/083237, filed on Nov. 30, 2011, which claims priority to Chinese Patent Application No. 201110028694.6, filed on Jan. 26, 2011, both of which are incorporated herein by reference in its entirety.

FIELD OF THE INVENTION

The present invention relates to a vector joint encoding/decoding method and a vector joint encoder/decoder.

BACKGROUND OF THE INVENTION

When a signal is processed, generally the signal may be divided into multiple vectors. For example, referring to FIG. 1, the signal sampling is classified, several sampling values are classified as a group, which may be referred to as a vector, and the number of this group of sampling values is referred to as the dimension of the vector. In a voice encoder based on a code excited linear prediction (CELP: Code Excited Linear Prediction) model, generally several pulses are used to denote quasi-white noise excitation. In order to reduce the complexity of the encoder, generally an input signal is divided into several sub-frames to be processed, and during processing a fixed code book, generally a signal of each sub-frame is further divided into several tracks. Based on the foregoing understanding about the vector, it may be regarded that sampling points on a track may form a multi-dimensional vector. For example, for a track having sixteen positions, it is assumed that a signal sampling case on a track is described by using a pulse, and a value may be represented as [−1, −5, 0, −5, 12, 0, . . . , 0]. From the perspective of the pulse, it is denoted that this track has four non-zero pulses, that is, a first position has a pulse with amplitude being 1, and a symbol being "−"; a second position has a pulse with amplitude being 5, and a symbol being "−"; a third position has a pulse with amplitude being zero, and the rest may be deduced by analogy. From the perspective of the vector, a 16-dimensional vector has four non-zero components.

It is well-known that, in the voice encoding field, a voice encoder based on the CELP model is applied very widely, such as: G.729, GSM and G.723.1, which are already widely applied in various digital signal processors (DSP: Digital Signal Processor), embedded devices, mobile phones and personal computers (PC: Personal computer). Compared with other types of voice encoders, the voice encoder/decoder based on the CELP model can achieve good voice quality in a case of an extremely low code rate, and still have excellent performance in a case of a high code rate.

In the vector encoding technology, usually an algebraic code book is used to perform quantization encoding on a residual signal after adaptive filtering. After information of a position and a symbol of an optimal algebraic code book pulse on a track is obtained through searching, a corresponding index value is obtained through encoding calculation, so that a decoding end can reestablish a pulse sequence according to the index value. Under the premise of ensuring lossless reestablishment, to reduce bits, which are needed for an encoding index value, as much as possible is one of main objectives of the research and development of an algebraic code book pulse encoding method.

The following takes an example of a preferable encoding method in voice encoding—an adaptive multi-rate wideband (AMR_WB+: Adaptive Multi-Rate Wideband) encoding method, to introduce a specific encoding method adopted for an existing algebraic code book pulse. According to the difference between encoding code rates, 1 to N pulses may be encoded on each track, and it is assumed that each track has $M=2^m$ positions, and procedures for encoding one to six pulses on each track in AMR_WB+ are respectively described as follows:

① One pulse is encoded on each track

Because each track has $2^m$ positions, a position index of a pulse on each track needs to be encoded with m bits, and a symbol index of the pulse needs to be encoded with 1 bit. An index value for encoding one pulse with a symbol is:

$$I_{1p}(m) = p + s \times 2^m$$

where $p \in [0, 2^m-1]$ is a position index of the pulse; s is a symbol index of the pulse, and when a symbol of the pulse is positive, s is set to 0, and when the symbol of the pulse is negative, s is set to 1; $I_{1p} \in [0, 2^{m+1}-1]$.

The number of bits needed for encoding one pulse on each track is: m+1.

② Two pulses are encoded on each track

According to a result of ①, m+1 bits are needed for encoding one pulse on each track, and m bits are needed for encoding a position index of another pulse; because the pulse order is not particularly needed, a symbol of another pulse may be denoted through a size relationship obtained by arranging position indexes of the pulses. An index value for encoding two pulses is:

$$I_{2p}(m) = p1 + I_{1p0} \times 2^m = p1 + p0 \times 2^m + s \times 2^{2m}$$

where p0 and $p1 \in [0, 2^m-1]$ are position indexes of two pulses, respectively; s is a symbol index of pulse p0; a specific denotation rule for a symbol of pulse p1 is: p0<p1 denotes that symbols of the two pulses are the same, and p0>p1 denotes that the symbols of the two pulses are opposite; $I_{2p} \in [0, 2^{2m+1}-1]$.

The number of bits needed for encoding two pulses on each track is: 2m+1.

③ Three pulses are encoded on each track

Each track is divided into two sections: Section A and Section B, and each section includes $2^{m-1}$ positions. A certain section at least includes two pulses, and according to a result of ②, 2×(m−1)+1=2m−1 bits are needed for encoding the section; another pulse searches on the entire track, and according to a result of ①, m+1 bits are needed; furthermore, one bit is further needed to indicate a section including two pulses. An index value for encoding three pulses is:

$$I_{3p}(m) = I_{2p}(m-1) + k \times 2^{2m-1} + I_{1p}(m) \times 2^{2m}$$

where k is an index of Section; $I_{3p} \in [0, 2^{3m+1}-1]$.

The number of bits needed for encoding three pulses on each track is: 3m+1.

④ Four pulses are encoded on each track

Each track is divided into two sections: Section A and Section B, and each section includes $2^{m-1}$ positions. Cases of combinations of the numbers of pulses included in each section are shown in the following table:

| Type | Number of pulses in Section A | Number of pulses in Section B | Number of bits needed |
|---|---|---|---|
| 0 | 0 | 4 | 4m−3 |
| 1 | 1 | 3 | 4m−2 |
| 2 | 2 | 2 | 4m−2 |
| 3 | 3 | 1 | 4m−2 |
| 4 | 4 | 0 | 4m−3 |

In the above table, the basis of the number of bits needed, which correspond to each type is that: for type 0 and type 4, a method similar to ③ is adopted in a section having four pulses, but the number of pulses for performing whole searching is two, it is equivalent to $I_{2p}(m-2)+k\times 2^{2m-3}+I_{2p}(m-1)\times 2^{2m-2}$; for type 1, it is equivalent to $I_{1p}(m-1)+I_{3p}(m-1)\times 2^m$; for type 2, it is equivalent to $I_{2p}(m-1)+I_{2p}(m-1)\times 2^{2m-1}$; and for type 3, it is equivalent to $I_{3p}(m-1)+I_{1p}(m-1)\times 2^{3m-2}$.

Type 0 and type 4 are regarded as a kind of possible case, type 1 to type 3 each are used as a case, and totally there are four cases; therefore, two bits are needed to denote a corresponding case, thus type 1 to type 3 all need 4m−2+2=4m bits; moreover, for the case including type 0 and type 4, one bit is further needed for distinguishing, and therefore, type 0 and type 4 need 4m−3+2+1=4m bits.

The number of bits needed for encoding four pulses on each track is: 4m.

⑤ Five pulses are encoded on each track

Each track is divided into two sections: Section A and Section B, and each section includes $2^{m-1}$ positions. A certain section at least includes three pulses, and according to a result of ③, 3×(m−1)+1=3m−2 bits are needed for encoding the section; the rest two pulses search on the entire track, and according to a result of ②, 2m+1 bits are needed; furthermore, one bit is further needed to indicate a section including three pulses. An index value for encoding five pulses is:

$$I_{5p}(m)=I_{3p}(m-1)+k\times 2^{3m-2}+I_{1p}(m)\times 2^{3m-1}$$

The number of bits needed for encoding five pulses on each track is: 5m.

⑥ Six pulses are encoded on each track

Each track is divided into two sections: Section A and Section B, and each section includes $2^{m-1}$ positions. Cases of combinations of the numbers of pulses included in each section are shown in the following table:

| Type | Number of pulses in Section A | Number of pulses in Section B | Number of bits needed |
|---|---|---|---|
| 0 | 0 | 6 | 6m−5 |
| 1 | 1 | 5 | 6m−5 |
| 2 | 2 | 4 | 6m−5 |
| 3 | 3 | 3 | 6m−4 |
| 4 | 4 | 2 | 6m−5 |
| 5 | 5 | 1 | 6m−5 |
| 6 | 6 | 0 | 6m−5 |

In the above table, the basis of the number of bits needed, which correspond to each type, may be deduced following ④, and is not repeated again.

Type 0 and type 6, type 1 and type 5, type 2 and type 4 each are regarded as a possible case, type 3 is used as a case independently, and totally there are four cases; therefore, two bits are needed to denote a corresponding case, and type 3 needs 6m−4+2=6m−2 bits; for those cases including a combined type, one bit is further needed for distinguishing, and therefore, other types except for type 3 require 6m−5+2+1=6m−2 bits.

The number of bits needed for encoding six pulses on each track is: 6m−2.

In the process of proposing the present invention, it is found that, In the algebraic pulse encoding method provided by AMR_WB+, an encoding logic similar to recursion is adopted to split a case of encoding a large number of pulses into several cases of encoding a small number of pulses for processing, in which the calculation complexity is large, and meanwhile, with the increase of the number of pulses encoded on a track, the redundancy of an encoding index is gradually accumulated, thereby easily causing waste of encoding bits.

SUMMARY OF THE INVENTION

An embodiment of the present invention provides a vector joint encoding method capable of helping to save encoding bits.

A vector joint encoding method includes:

calculating an encoding index $Ind_t$ of each vector, where a subscript t denotes a $t^{th}$ vector, t∈[0, T−1], and T is the number of vectors and is an integer greater than or equal to 2;

splitting at least one $Ind_t$ at least once into at least two sections, where the splitting at least once is equivalent to splitting the $Ind_t$ into two split indexes $Ind_{t0}$ and $Ind_{t1}$ according to a set factor $SLF_t$, the $SLF_t$ is a positive integer, the $Ind_{t0}$ denotes a serial number of an interval to which the $Ind_t$ belongs, the $Ind_{t1}$ denotes a serial number of the $Ind_t$ in the interval to which the $Ind_t$ belongs, the length of the interval is not greater than the $SLF_t$, and $$Ind_t \leq Ind_{t0}\times SLF_t + Ind_{t1};$$

combine a split index of at least one vector and split indexes or encoding indexes of other vectors to generate a combined index $Ind_{SLF}$; and encode according to the combined index and other uncombined split indexes.

An embodiment of the present invention further provides a multi-stage cascade encoding method based on the foregoing vector joint encoding method.

Embodiments of the present invention also provide a decoding method and an encoder/decoder corresponding to the foregoing encoding method.

In the embodiments of the present invention, more than two vectors are jointly encoded, and an encoding index of at least one vector is split and then combined between different vectors, so that encoding idle spaces of different vectors can be recombined, thereby helping to save encoding bits, and because an encoding index of a vector is split and then shorter (compared with an index before splitting) split indexes are recombined, thereby helping to reduce requirements for the bit width of operating parts in encoding/decoding calculation.

DETAILED DESCRIPTION OF THE EMBODIMENTS

Figure 1:
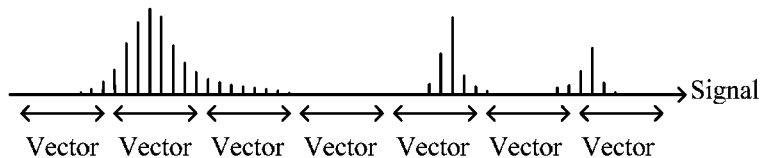
FIG. 1 is a schematic diagram of vector division of a signal.

An embodiment of the present invention provides a vector joint encoding method, more than two vectors are jointly encoded, and an encoding index of at least one vector is split and then combined between different vectors, thereby saving encoding bits and reducing the length of data participating in calculation. Embodiments of the present invention further provide a vector joint decoding method and a vector joint encoder/decoder correspondingly.

In order to make description concise and understandable, pulse distribution on a track is used as an example for a vector below, and joint encoding for multiple tracks is described to embody joint encoding for multiple vectors. It is easily understood that, the present invention is not limited to encoding/decoding for track pulse distribution, and as long as it is needed to perform encoding/decoding processing on multiple vectors formed of a group of data, the solution provided in the present invention may be adopted, and "track" and "pulse" merely endow data in a vector with a concrete meaning, and do not form a substantial limitation.

In a voice encoder, information about positions and symbols (if related) of all pulses on each track is obtained through code book searching, and the information needs to be completely transferred to a decoding end, so that the information about the positions and the symbols (if related) of all the pulses can be uniquely recovered at the decoding end, and meanwhile, in order to reduce a bit rate as much as possible, it is expected to use bits as fewer as possible to transfer the information.

It can be known through theoretical analysis that, the permutation and combination number of positions and symbols (if related) of all pulses on a same track is a minimal value of a codebook space, and the number of corresponding encoding bits is a theoretical lower limit value. The total number of positions and the total number of pulses on a track are fixed. As far as a case that the total number of positions and the total number of pulses on a track are different values is concerned, the permutation and combination number of positions and symbols of all pulses is not always an integer power of 2, and therefore the theoretical lower limit value of the number of encoding bits is not always an integer, and in this case, the actual number of encoding bits for single-track encoding is at least the integer section of the theoretical lower limit value plus 1, so that occurrence of partial idle codebook space is unavoidable. For example, Table 1 provides a theoretical lower limit value and an actual lower limit value of the number of encoding bits, and a situation of an idle space, which are on a track with the total number of positions being 16 in a case that the total number N of pulses needed to be encoded is 1 to 7 (that a pulse has a symbol is taken into account).

TABLE 1

| | Number of bits (bit) needed | | | | |
|---|---|---|---|---|---|
| N | Total permutation and combination number | Theoretical lower limit value | Actual lower limit value for single-track encoding | Number of idle combinations | Idle proportion |
| 1 | 32 | 5 | 5 | 0 | 0 |
| 2 | 512 | 9 | 9 | 0 | 0 |
| 3 | 5472 | 12.4179 | 13 | 2720 | 33.2% |
| 4 | 44032 | 15.4263 | 16 | 21504 | 32.8% |
| 5 | 285088 | 18.1210 | 19 | 239200 | 45.6% |
| 6 | 1549824 | 20.5637 | 21 | 547328 | 26.1% |
| 7 | 7288544 | 22.7972 | 23 | 1100064 | 15.1% |

It may be seen from Table 1 that, in a majority of cases, the actual lower limit value still brings about large waste of the codebook space, and therefore, the present invention proposes that, more than two tracks are jointly encoded, an encoding index of at least one track is split into at least two split indexes, and then a split index of a track and split indexes or encoding indexes of other tracks are combined and then used for encoding.

This method is based on an idea as follows: joint encoding for more than two tracks may enable idle codebook spaces in single-track encoding to be combined, and once combined idle spaces are sufficient, one actual encoding bit may be reduced. However, if encoding indexes on more than two tracks are directly combined, a final encoding length may be large, or even may exceed the bit width (such as 64 bits) generally used for operating, and at this time, it is needed to design dedicated calculation processing procedure codes for operations of encoding or decoding such as addition, subtraction, multiplication, and division, thereby resulting in increase of the processing complexity.

Therefore, it is taken into account that, an encoding index of at least one track is split, inter-track combination is performed with at least one split index, and in this way, inter-track idle spaces can be combined to a certain extent, and meanwhile, the length of a value participating in operating is also reduced.

The theoretical analysis for the principle of the multi-track joint encoding of the present invention is provided above, and below, various preferable solutions are illustrated in detail with specific embodiments, respectively.

Figure 2:
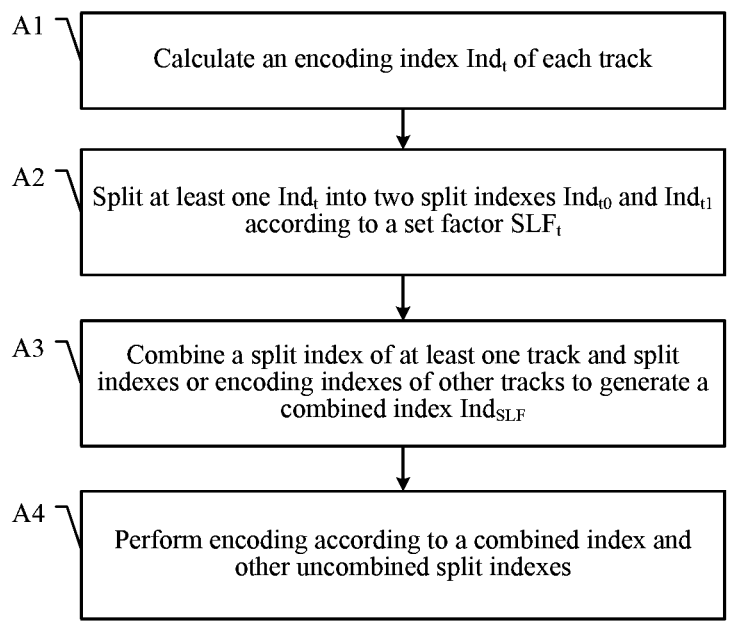
FIG. 2 is a schematic flowchart of an encoding method according to Embodiment 1 of the present invention.

Embodiment 1: A track joint pulse encoding method, as shown in FIG. 2, includes the following steps:

A1: Calculate an encoding index $Ind_t$ of each track, where a subscript t denotes a $t^{th}$ track, t∈[0, T−1], and T is the number of tracks and is an integer greater than or equal to 2.

Various existing methods may be adopted for calculating $Ind_t$ of each track. For example, for the single-track encoding index calculation method provided in Chinese Patent Application (Publication Date being Oct. 29, 2008) with Publication No. being CN101295506, especially reference may be made to row 18, page 13 to row 9, page 15 (Embodiment 2, FIG. 14 and FIG. 15) in the specification of the application document, and for a corresponding decoding calculation method, reference may be made to row 23, page 16 to row 12, page 17 (Embodiment 4) in the specification of the application document. Also for example, for the single-track encoding index calculation method provided in Chinese Patent Application (Publication Date being Mar. 18, 2009) with Publication No. being CN101388210, especially reference may be made to row 23, page 8 to row 7, page 10 (Embodiment 2, FIG. 7) in the specification of the application document, and for a corresponding decoding calculation method, reference may be made to row 10, page 21 to row 27, page 21 (Embodiment 6) in the specification of the application document.

In order to better save encoding bits, during selection of an $Ind_t$ calculation method, a calculation method capable of reaching the theoretical lower limit value of the number of single-track encoding bits may be selected as much as possible. Moreover, a calculation method enabling the value range of $Ind_t$ to be continuous or be continuous as much as possible is further preferably used, so as to utilize the idle space. It should be noted that, as long as both the encoding end and the decoding end may determine a calculation method adopted by a track, different tracks may adopt different $Ind_t$ calculation methods.

A2: Split at least one $Ind_t$ at least once into at least two sections, where splitting at least once is equivalent to splitting $Ind_t$ into two split indexes $Ind_{t0}$ and $Ind_{t1}$ according to a set factor $SLF_t$.

The splitting of $Ind_t$ may be understood as follows: that index information is borne by a parameter is converted into that index information is borne by more than two parameters. For example, that originally a parameter with the value range being [0, 99] indicates one hundred cases may be split into that two parameters with the value range being [0, 9] commonly indicate the one hundred cases.

$Ind_t$ may be split into multiple split indexes, such as $Ind_{t0}$, $Ind_{t1}$, $Ind_{t2}$, $Ind_{t3}$, . . . , and the like. In actual calculation, a split index needed by the present invention may be obtained by directly splitting $Ind_t$, or may be obtained by splitting again a section split by $Ind_t$; no matter which case it is, the splitting for obtaining the split index (that is, a split index used for subsequent combination) needed by the present invention may be equivalently understood as a process of splitting $Ind_t$ into two split indexes $Ind_{t0}$ and $Ind_{t1}$, one of which is a split index used for subsequent combination, and the other of which may be understood as a section including the rest information of $Ind_t$.

Therefore, the factor $SLF_t$ may be understood as follows: the value range of the original $Ind_t$ is divided into several intervals, the length of each interval is not greater than $SLF_t$, $SLF_t$ is a positive integer, $Ind_{t0}$ denotes a serial number of an interval to which $Ind_t$ belongs, and $Ind_{t1}$ denotes a serial number of $Ind_t$ in the interval to which $Ind_t$ belongs (apparently, $Ind_{t1} \leq SLF_t$), and:

$$Ind_t \leq Ind_{t0} \times SLF_t + Ind_{t1};$$

When the less-than sign is taken in the above formula, it means that, a space jointly provided by $Ind_{t0}$ and $Ind_{t1}$ may be greater than a space originally occupied by $Ind_t$; because generally the idle encoding space of $Ind_t$ has some remainders, if the joint space of $Ind_{t0}$ and $Ind_{t1}$ is slightly larger, generally final encoding bit saving may not be influenced unfavorably.

Definitely, The most economical case is that splitting is able to be performed as much as possible according to the space size of $Ind_t$, that is:

$Ind_{t0}=Int(Ind_t/SLF_t)$, where Int( ) denotes rounding down to an integer, and $Ind_{t1}=Ind_t\% SLF_t$, where % denotes taking a remainder.

In this case, if the value range of $Ind_t$ is continuous, compared with the value range of $Ind_t$, what is idle of the space jointly provided by $Ind_{t0}$ and $Ind_{t1}$ is just a difference between a maximal value of $Ind_{t1}$ and $SLF_t$ when $Ind_{t0}$ takes a maximal value.

Different tracks may adopt different $SLF_t$, and if multiple split indexes are split on a same track, each splitting may also use different $SLF_t$, as long as $SLF_t$ used by a certain split index split by a certain track is determined.

A3: Combine a split index of at least one track and split indexes or encoding indexes of other tracks to generate a combined index $Ind_{SLF}$.

Corresponding to "splitting", the "combination" may be understood as follows: that index information is borne by more than two parameters is converted into that index information is borne by one parameter. Apparently, the value range of a parameter after combination is greater than or at least equal to a product of value ranges of each parameter before combination. The combination of multiple parameters may be denoted with a formula as follows:

$$AI=((((a_I \times A_{I-1}+a_{I-1}) \ldots) \times A_2+a_2) \times A_1+a_1) \times A_0+a_0$$

where AI denotes a parameter after combination, $a_i$ denotes I+1 parameters before combination, $i \in [0, I]$, and $A_i$ denotes the number of all values of $a_i$. This combination manner is the most compact, the value range of a parameter after combination is equal to a product of value ranges of each parameter before combination, and all parameter combination mentioned here may adopt this manner. Definitely, other combination manners may be further adopted. For example, the value range of a parameter after combination may be greater than a product of value ranges of each parameter before combination as long as a parameter after combination can completely retain information of each parameter before combination; if the value space of a parameter after combination does not exceed much compared with a product of value spaces of each parameter before combination, generally final encoding bit saving may not be influenced unfavorably.

In the present invention, a generated combined index at least includes a split index of a track, and furthermore, split indexes or encoding indexes of other tracks may participate in combination. It should be noted that, the present invention does not limit the number of combined indexes, and if a track provides multiple split indexes for participating in combination, the split indexes may be respectively combined into different combined indexes.

A4: Perform encoding according to a combined index and other uncombined split indexes.

① The combined index and each uncombined split index may be directly encoded respectively. Because each combination section in the combined index carries a part of an idle space from a track, it is possible to save encoding bits fixedly.

② Furthermore, a variable-length encoding manner may be further adopted for a combined index, so as to save more encoding bits of the combined index, that is:

comparing the combined index $Ind_{SLF}$ and adjusting a threshold value THR, where, $$THR \leq 2^{\wedge}(K_{SLF}) - Ind_{SLF,max},$$

$2^{\wedge}(K_{SLF})$ denotes a $K_{SLF}$ power of 2, the $K_{SLF}$ is the length of the bit sequence of the $Ind_{SLF,max}$, and the $Ind_{SLF,max}$ denotes a maximal value of the $Ind_{SLF}$;

if the $Ind_{SLF}$ is less than the THR, encoding the $Ind_{SLF}$ by using a first number of encoding bits; otherwise, encoding the $Ind_{SLF}$ added with an offset value $THR_0$ by using a second number of encoding bits, in which $THR \leq THR_0 \leq 2^{\wedge}(K_{SLF}) - Ind_{SLF,max}$, the first number is less than the second number, the second number is less than or equal to the $K_{SLF}$, and the first number and the second number are both positive integers.

For the principle, specific deduction and description of the foregoing method for saving bits, reference is made to Chinese Patent Application with Application No. being CN200910150637.8 (Application Date being Jun. 19, 2009).

③ The combined index may be split, then combined with other uncombined split indexes and then encoded.

That is, the combined index is split into T1 recombined indexes $Ind_{t0}'$ according to a set value range, in which T1 is less than or equal to the number of tracks generating the combined index (the number of values of t here may be less than the number T of values of t originally denoting a $t^{th}$ track, but because a recombined index is used for recombination with an uncombined split index of a corresponding track t, the subscript t is still used continuously to denote being corresponding to a track), a value range of at least one $Ind_{t0}'$ is greater than a value range of the split index, participating in combination, of the corresponding track t, and a value range of at least one $Ind_{t0}'$ is less than a value range of the split index, participating in combination, of the corresponding track t. Here, The splitting of a combined index may be performed with reference to the splitting of an encoding index in step A2, but it is needed to split T1 recombined indexes, each splitting may be based on the same or different value ranges, and the foregoing limitation to the value range of the split recombined index enables the idle space converged by the combined index to be concentrated on certain recombined indexes to a certain extent during splitting, thereby facilitating saving of encoding bits.

Each recombined index and an uncombined split index of a corresponding track are respectively combined and then encoded, and if a track without being allocated a recombined index exists, an uncombined split index of the track is encoded. For the combination of a recombined index and a split index of a corresponding track, reference may be made to the aforementioned combined index combination process. Because the combined index aggregates the idle space, in a case that the encoding bits of an original track for an allocated recombined index are not increased, the splitting of the combined index is completed before certain tracks may be allocated a recombined index, and in this case, only the uncombined split index of the track may be encoded.

Definitely, if there is another track which does not provides a split index and whose encoding index does not participate in combination, the track may be regarded as an independent encoding track, and is not discussed in the present invention.

Figure 3:
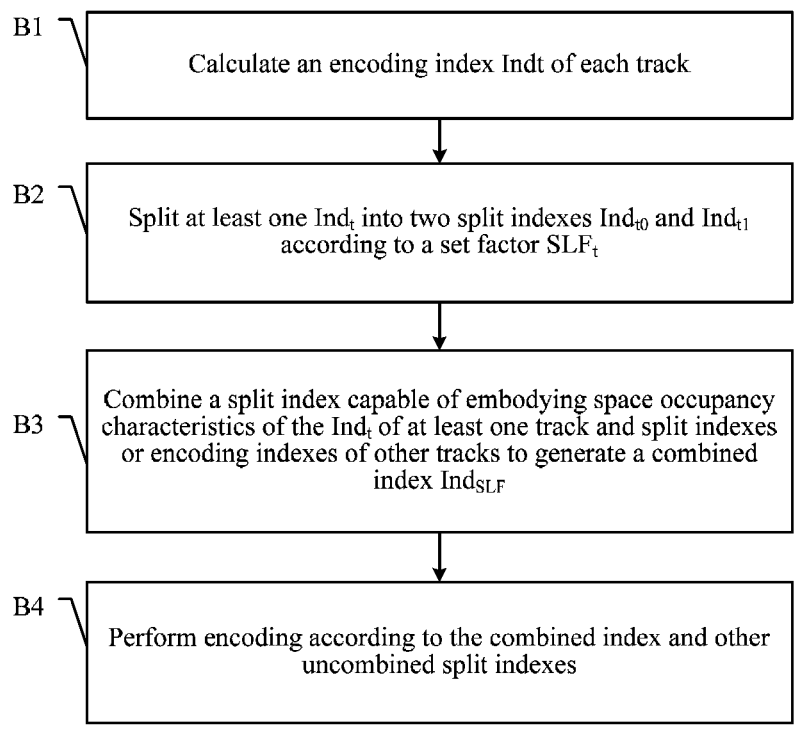
FIG. 3 is a schematic flowchart of an encoding method according to Embodiment 2 of the present invention.

Embodiment 2: A track joint pulse encoding method. This embodiment provides a preferable solution for selecting split indexes to be combined on the basis of Embodiment 1, as shown in FIG. 3, which includes the following steps:

B1: Calculate an encoding index $Ind_t$ of each track.

B2: Split at least one $Ind_t$ at least once into at least two sections, where splitting at least once is equivalent to splitting $Ind_t$ into two split indexes $Ind_{t0}$ and $Ind_{t1}$ according to a set factor $SLF_t$.

Step B1 and step B2 may be executed with reference to step A1 and step A2 of Embodiment 1.

B3: Combine a split index of at least one track and split indexes or encoding indexes of other tracks to generate a combined index $Ind_{SLF}$, and, when a split index participating in combination is selected, select, for a track t, a split index capable of embodying space occupancy characteristics of the $Ind_t$ to participate in combination.

Being capable of embodying space occupancy characteristics of the $Ind_t$ refers to that, compared with other split indexes, an occupancy rate of a value range of a selected split index for an encoding space is the closest to an occupancy rate of a value range of the $Ind_t$ for the encoding space.

In the present invention, because idle spaces of different tracks are combined to assist in saving encoding bits, in order to achieve better effect of utilizing the idle space, it is expected that the value range of the split index representing the track t to perform combination can maintain the idle proportion of the encoding space of the value range of $Ind_t$ as much as possible, which means that the value range of the rest section of $Ind_t$ is closer to full utilization of the encoding space, such as, close to an integer power of 2.

B4: Perform encoding according to the combined index and other uncombined split indexes.

Step B4 may be executed with reference to step A4 of Embodiment 1.

Adoption of the solution of this embodiment can further ensure the effect that a combined index saves encoding bits.

Figure 4:
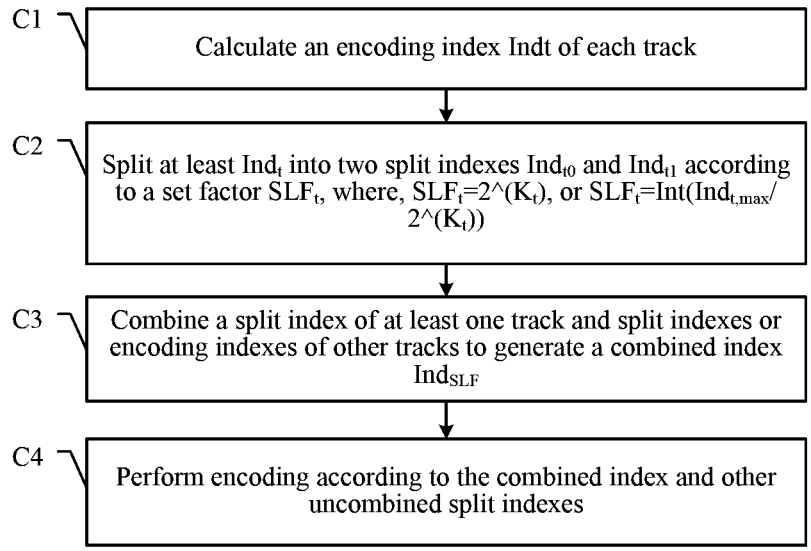
FIG. 4 is a schematic flowchart of an encoding method according to Embodiment 3 of the present invention.

Embodiment 3: A track joint pulse encoding method. This embodiment provides a preferable solution for splitting an encoding index on the basis of Embodiment 1, as shown in FIG. 4, which includes the following steps:

C1: Calculate an encoding index $Ind_t$ of each track.

Step C1 may be executed with reference to step A1 of Embodiment 1.

C2: Split at least one $Ind_t$ at least once into at least two sections, where splitting at least once is equivalent to splitting $Ind_t$ into two split indexes $Ind_{t0}$ and $Ind_{t1}$ according to a set factor $SLF_t$, $Ind_{t0}=Int(Ind_t/SLF_t)$, and $Ind_{t1}=Ind_t\% SLF_t$, where, $SLF_t=2^{\wedge}(K_t)$, or $SLF_t=Int(Ind_{t,max}/2^{\wedge}(K_t))$, $K_t$ is a positive integer, and $Ind_{t,max}$ denotes a maximal value of $Ind_t$.

① When $SLF_t=2^{\wedge}(K_t)$, $Ind_{t0}=Int(Ind_t/2^{\wedge}(K_t))$, and $Ind_{t1}=Ind_t\%2^{\wedge}(K_t)$.

In this case, the value range of $Ind_{t1}$ can fully utilize an encoding space, what is idle is just a difference between a maximal value of $Ind_{t1}$ and $2^{\wedge}(K_t)$ when $Ind_{t0}$ takes a maximal value, and the value range of $Ind_{t0}$ fully retains the space occupancy characteristics of $Ind_t$. Apparently, the smaller the $K_t$ is, the closer the space characteristics of $Ind_{t0}$ are to $Ind_t$, and when $K_t$ is 0, $Ind_{t0}$ is degenerated into $Ind_t$.

② When $SLF_t=Int(Ind_{t,max}/2^{\wedge}(K_t))$, this case is just opposite to ①, and actually, it is equivalent to that $Ind_{t0}$ and $Ind_{t1}$ in ① exchange positions, the value range of $Ind_{t0}$ can fully utilize the encoding space, and the value range of $Ind_{t1}$ fully retains the space occupancy characteristics of $Ind_t$. Apparently, the smaller the $K_t$ is, the closer the space characteristics of $Ind_{t1}$ are to $Ind_t$, and when $K_t$ is 0, $Ind_{t1}$ is degenerated into $Ind_t$.

C3: Combine a split index of at least one track and split indexes or encoding indexes of other tracks to generate a combined index $Ind_{SLF}$.

It may be known according to the analysis in Embodiment 2 that, if a combined index needs to achieve better effect of saving encoding bits, it is needed to select a split index that retains the space characteristics of $Ind_t$ as much as possible, and therefore, for the track t providing a split index to participate in combination, if $SLF_t=2^{\wedge}(K_t)$, it is appropriate to select $Ind_{t0}$ to participate in combination, and if $SLF_t=Int(Ind_{t,max}/2^{\wedge}(K_t))$, it is appropriate to select $Ind_{t1}$ to participate in combination.

Moreover, it may be known according to the analysis of step C2 that, the smaller the $K_t$ is, the better the space characteristics retained by the split index selected to participate in combination are. However, the length of a corresponding combined index is increased, and therefore, the length of the split index participating in combination may be determined according to the condition of an actual track (such as, the length of the original encoding index, and the idle extent of the space). During actual design, proportions of idle spaces, which can be retained by split indexes used for combination and corresponds to different values of Kt, may be calculated one by one, and a $K_t$ value, which can maintain an idle space of a high proportion and does not cause a split index participating in combination to be excessively long, is selected. For example, it may be selected that $K_t = K_{t,max} - 2$, or $K_t = K_{t,max} - 3$, or $K_t = K_{t,max} - 4$, where the $K_{t,max}$ is the length of a bit sequence of the $Ind_{t,max}$.

C4: Perform encoding according to the combined index and other uncombined split indexes.

Step C4 may be executed with reference to step A4 of Embodiment 1.

The $Ind_t$ splitting manner provided in this embodiment can ensure that one of split indexes retains the space occupancy characteristics of $Ind_t$ as much as possible, so that the combined index may better save encoding bits.

Figure 5:
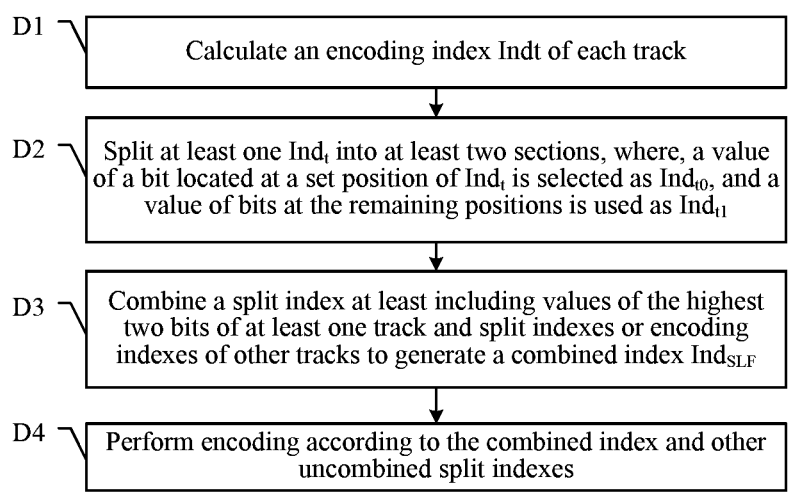
FIG. 5 is a schematic flowchart of an encoding method according to Embodiment 4 of the present invention.

Embodiment 4: A track joint pulse encoding method. This embodiment provides a simple, convenient and easy solution for splitting an encoding index on the basis of Embodiment 1, as shown in FIG. 5, which includes the following steps:

D1: Calculate an encoding index $Ind_t$ of each track.

Step D1 may be executed with reference to step A1 of Embodiment 1.

D2: Split at least one $Ind_t$ at least once into at least two sections, where splitting at least once is equivalent to splitting $Ind_t$ into two split indexes $Ind_{t0}$ and $Ind_{t1}$ according to a set factor $SLF_t$, and the specific practice is, selecting a value of a bit located at a set position of $Ind_t$ as $Ind_{t0}$, and a value of bits at remaining positions as $Ind_{t1}$.

In this embodiment, a split index is directly obtained from $Ind_t$ according to a bit splitting manner. Apparently, in this case, $SLF_t = 2^{\wedge}(K_t)$, where the number of bits at the set position is $K_{t0}$, the number of bits at the remaining position is $K_t$, $K_{t0} + K_t = K_{t,max}$, $K_{t,max}$ is the length of the bit sequence of $Ind_{t,max}$, and $Ind_{t,max}$ denotes a maximal value of $Ind_t$.

It is easily understood that, when the set bits forming a certain split index are not continuous, it means that the value range of $Ind_t$ is discontinuously allocated into several intervals with a length being $SLF_t$, but occupancy characteristics of the split index for the encoding space is not influenced by whether an included value range is continuous, and is only relevant to whether the intervals are fully padded.

It should be noted that, when a parameter is split in a bitwise manner, a position of a bit is described according to the bit sequence length of the maximal value of the parameter. For example, if the bit sequence length of $Ind_{t,max}$ is 10, a value of $Ind_t$ may be merely 2 at a certain time (unless otherwise specially illustrated, the values used here are all decimal), and the effective bit sequence length of $Ind_t$ are only 2 bits, but when the parameter is split in a bitwise manner, a position needed to split a bit is still calculated starting from the highest 10 bits.

Moreover, it may be seen in contrast with the situation ① described in step C2 of Embodiment 3 that, the situation ① is actually equivalent to that in the bit sequence with a length being $K_{t,max}$, a value of $K_{t0}$ bits starting from the highest bit of $Ind_t$ is selected as $Ind_{t0}$, and a value of remaining bits is selected as $Ind_{t1}$, that is, $Ind_t$ is divided into two segments according to a bit priority, and a value of each segment is corresponding to a split index.

D3: Combine a split index of at least one track and split indexes or encoding indexes of other tracks to generate a combined index $Ind_{SLF}$, and the specific practice is, selecting a split index of $Ind_t$ at least including values of the highest two bits to participate in combination.

It may be known according to the analysis in Embodiment 2 that, if a combined index is needed to achieve better effect of saving encoding bits, it is needed to select a split index that retains the space characteristics of $Ind_t$ as much as possible, and when $Ind_t$ is split in a bitwise manner, apparently, several highest bits are the most capable of reflecting the space characteristics of $Ind_t$, and therefore, no matter whether bits forming a split index are continuous, a split index including values of the highest two bits is preferably selected to participate in combination. Definitely, a more preferable situation is, when $Ind_t$ is split according to the bit priority of the bit sequence, a split index corresponding to a split segment located at a high bit is selected to participate in combination, such as $Ind_{t0}$ in the situation ① described in step C2 of Embodiment 3.

D4: Perform encoding according to the combined index and other uncombined split indexes.

Step D4 may be executed with reference to step A4 of Embodiment 1. Moreover, if a manner is adopted, in which the combined index is split, then combined with other uncombined split indexes and then encoded, the splitting of the combined index may also be performed with reference to the foregoing step D2, that is, splitting the total length $K_{SLF}$ of the bit sequence of the combined index into T1 sections according to a set length, in which T1 is less than or equal to the number of tracks generating the combined index, a value of each section is corresponding to one $Ind_{t0}$', the $K_{SLF}$ is the length of the bit sequence of the $Ind_{SLF,max}$, and the $Ind_{SLF,max}$ denotes a maximal value of the $Ind_{SLF}$. For example, splitting the $K_{SLF}$ according to a $K_{t0}$ value used by the track t generating the combined index, in which the number of bits split by each $Ind_{t0}$' correspondingly is less than or equal to the $K_{t0}$ value used by a corresponding track t.

For example, if four tracks exist, and each track respectively extracts the highest four bits of an encoding index as a split index for participating in combination, after the combination, the combined index may be split likewise with 4 bits as a segment, and is used as a recombined index to replace the highest four bits of an original encoding index. The combined index combines an idle space, and the bit sequence length may be less than 4+4+4+4, so the recombined index obtained by a certain track may only have 3 bits or even less, which become encoding bits which are fixedly saved. It should be noted that, when split indexes are combined into a combined index, the operation of saving bits is completed, so when the combined index is split in a bitwise manner, no special rule is needed, and as long as an encoding end and an decoding end adopt a same rule, bits may be continuously segmented or may not be continuously extracted.

This embodiment provides a simple, convenient and easy $Ind_t$ splitting manner, which can not only ensure that one of split indexes retains the space occupancy characteristics of $Ind_t$ as much as possible, but also is implemented conveniently.

Figure 6:
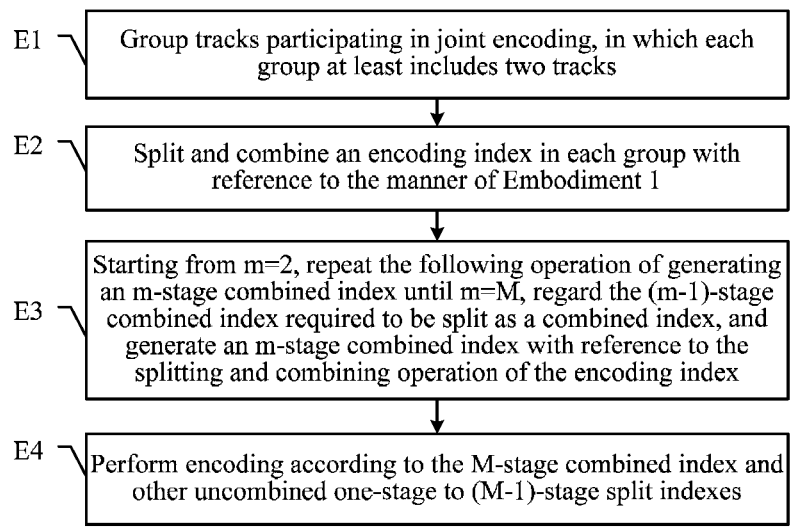
FIG. 6 is a schematic flowchart of an encoding method according to Embodiment 5 of the present invention.

Embodiment 5: A track joint pulse encoding method. This embodiment provides a layered cascade track joint pulse encoding method on the basis of Embodiment 1, as shown in FIG. 6, which includes the following steps:

E1: Group tracks participating in joint encoding, in which each group at least includes two tracks.

For example, sixteen tracks participate in joint encoding, every four tracks form one group, and totally four groups are formed.

E2: Split and combine an encoding index in each group with reference to the manner of Embodiment 1.

That is, an encoding index of each track is calculated; at least two encoding indexes are split; each encoding index is split at least once into at least two sections, where splitting at least once is equivalent to splitting an encoding index into two one-stage split indexes according to a set one-stage factor, one one-stage split index denotes serial numbers of several intervals with a length not greater than a set value, the other one-stage split index denotes a serial number of the encoding index in the interval to which the encoding index belongs; and one-stage split indexes from at least two tracks are combined to generate a one-stage combined index.

E3: Starting from m=2, repeat the following operation of generating an m-stage combined index until m=M; split at least two (m−1)-stage combined indexes, in which m∈[2, M], M is an integer greater than or equal to 2; split each (m−1)-stage combined index at least once into at least two sections, where the splitting at least once is equivalent to splitting an (m−1)-stage combined index into two m-stage split indexes according to a set m-stage factor; and combine m-stage split indexes from at least two (m−1)-stage combined indexes to generate an m-stage combined index.

By regarding the (m−1)-stage combined index needed to be split as the encoding index in each aforementioned embodiment, the foregoing splitting and combination procedure for each stage may be performed with reference to corresponding description, and is not repeated again. For example, with reference to Embodiment 4, the one-stage split index used for generating the one-stage combined index may be a value intercepted from a set bit of a corresponding encoding index starting from the highest bit; and the m-stage split index used for generating the m-stage combined index may be a value intercepted from a set bit of a corresponding (m−1)-stage combined index starting from the highest bit.

E4: Perform encoding according to the M-stage combined index and other uncombined one-stage to (M−1)-stage split indexes.

Similar to step A4 in Embodiment 1, the M-stage combined index and other uncombined one-stage to (M−1)-stage split indexes may be directly encoded respectively. Or further, the M-stage combined index may be split, then combined with other uncombined (M−1)-stage split indexes and then encoded, which is not repeated again here.

It should be noted that, although in the foregoing encoding procedure, in order to make description clear and be provided with cyclical operability, splitting and combination of each stage are consistently described, actually, it may also be the same as Embodiment 1, a split index is permitted to participate in combination, and also an encoding index (for first-stage combination) or combined index (for combination above second-stage) is permitted to directly participate in combination, or even a split index may be permitted to participate in combination (such as, an uncombined one-stage split index participates in generation of a three-stage combined index) by skipping a stage, but in these cases, it is needed to set a splitting and combination rule for each stage, so that the encoding end and the decoding end maintain consistent.

This embodiment is applicable to joint encoding for excessive tracks, such as 16 or 32 or even more tracks, in a multi-track case, even if each track only extracts several bits of split indexes to be combined, the combined index is also made excessively long, and in this case, the foregoing layered cascade manner is adopted, through multi-layered splitting and combination, it can be ensured that idle spaces are fully combined, and the combined index is not made excessively long.

Figure 7:
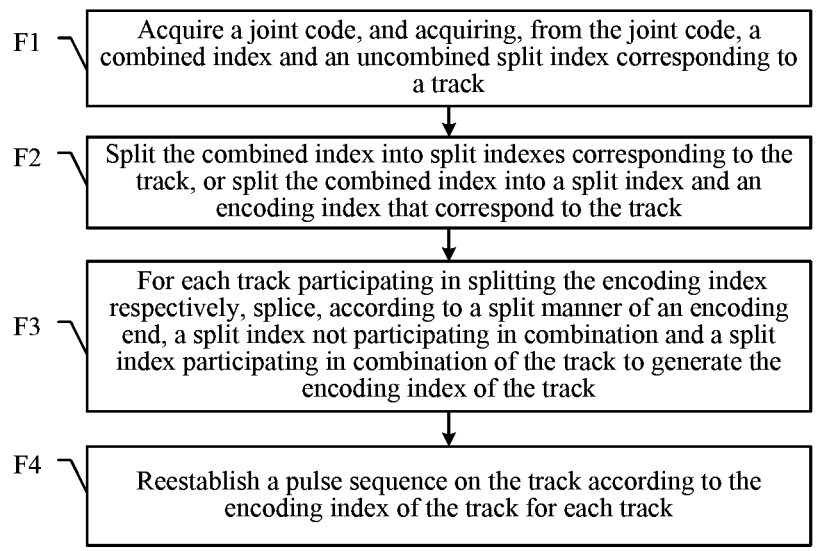
FIG. 7 is a schematic flowchart of a decoding method according to Embodiment 6 of the present invention.

Embodiment 6: A track joint pulse decoding method. The decoding method provided in this embodiment decodes the joint code obtained according to the encoding method of Embodiment 1 to Embodiment 4, and a decoding procedure is an inverse procedure for an encoding procedure, as shown in FIG. 7, which includes the following steps.

F1: Acquire a joint code, and acquiring, from the joint code, a combined index and an uncombined split index corresponding to a track.

The process of extracting each index from the joint code may be performed according to the inverse process of executing an operation on each index during encoding.

For example, if an encoding end directly encodes a combined index and each uncombined split index respectively, each index is directly decoded.

Also for example, if the encoding end adopts a variable-length encoding manner for the combined index, the encoding length of the combined index is determined and then is correspondingly decoded (with reference to Chinese Patent Application with Application No. being CN200910150637.8).

Further for example, if the encoding end splits the combined index, which is then combined with other uncombined split indexes and then encoded, a code corresponding to each track is extracted from the joint code, and a recombined index and an uncombined split index are split from a code of each track; if a code including no recombined index exists, an uncombined split index corresponding to a corresponding track is directly obtained, and then all recombined indexes are spliced into a combined index according to the splitting manner of the encoding end.

F2: Split the combined index into split indexes corresponding to the track, or split the combined index into a split index and an encoding index that correspond to the track.

This step is performed inversely with reference to the manner in which the encoding end generates the combined index.

For example, if the encoding end generates a combined index in an AI=((((a$_I$×A$_{I-1}$+a$_{I-1}$) . . . )×A$_2$+a$_2$)×A$_1$+a$_1$)×A$_0$+a$_0$ manner, during decoding, a value of a$_0$ may be obtained by calculating AI % A$_0$, then a value of a$_1$ may be obtained by calculating Int(AI/A$_0$) % A$_1$, and the rest may be deduced by analogy, until all a$_i$ is obtained.

F3: For each track participating in splitting the encoding index, splice, according to a split manner of an encoding end, a split index not participating in combination and a split index participating in combination of the track to generate the encoding index of the track.

Definitely, for those tracks that are not split but directly use an encoding index to participate in combination, step F2 may obtain the encoding index of those tracks, and this step may be omitted.

F4: Reestablish a pulse sequence on the track according to the encoding index of the track for each track.

The encoding end uses the manner in which the split indexes are combined, so likewise, a decoding end may obtain the benefit of reducing the bit width requirement for value processing.

Figure 8:
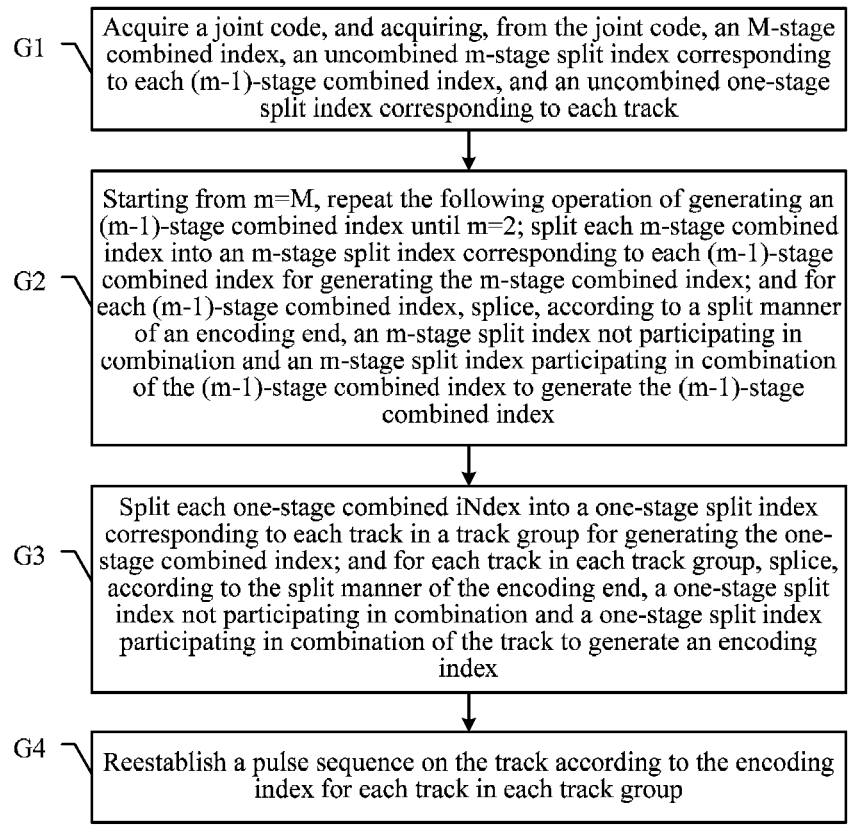
FIG. 8 is a schematic flowchart of a decoding method according to Embodiment 7 of the present invention.

Embodiment 7: A track joint pulse decoding method. The decoding method provided in this embodiment decodes the joint code obtained according to the layered cascade encoding method of Embodiment 5, and a decoding procedure is an inverse procedure of an encoding procedure, as shown in FIG. 8, which includes the following steps:

G1: Acquire a joint code, and acquiring, from the joint code, an M-stage combined index, an uncombined m-stage split index corresponding to each (m−1)-stage combined index, and an uncombined one-stage split index corresponding to each track, in which M is an integer greater than or equal to 2, and m∈[2, M].

With reference to step F1 of Embodiment 6, the index extracting process is performed according to the inverse process of executing an operation on each index during encoding likewise, and is not repeated again.

G2: Starting from m=M, repeat the following operation of generating an (m−1)-stage combined index until m=2; split each m-stage combined index into an m-stage split index corresponding to each (m−1)-stage combined index for generating the m-stage combined index; and for each (m−1)-stage combined index, splice, according to a split manner of an encoding end, an m-stage split index not participating in combination and an m-stage split index participating in combination of the (m−1)-stage combined index to generate the (m−1)-stage combined index.

G3: Split each one-stage combined index into a one-stage split index corresponding to each track in a track group for generating the one-stage combined index; and for each track in each track group, splice, according to the split manner of the encoding end, a one-stage split index not participating in combination and a one-stage split index participating in combination of the track to generate an encoding index.

G4: Reestablish a pulse sequence on the track according to the encoding index for each track in each track group.

Figure 9:
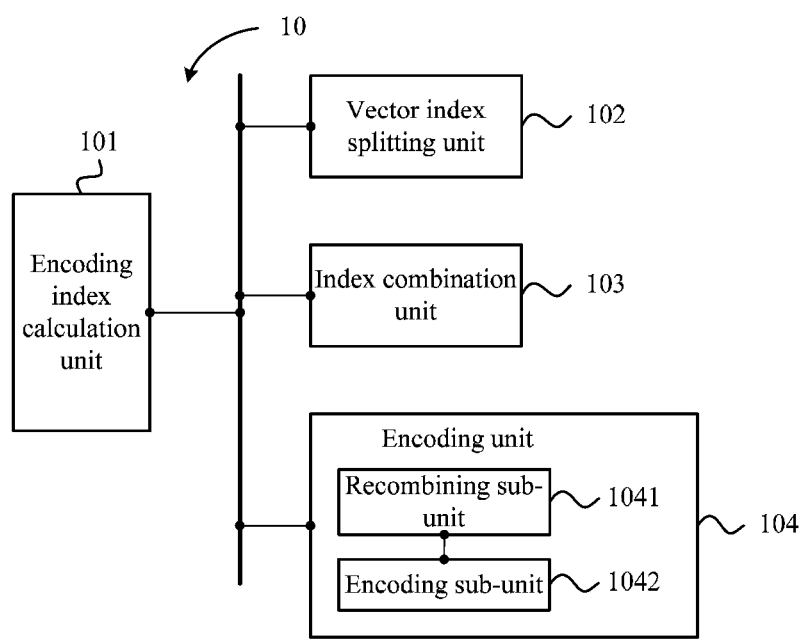
FIG. 9 is a schematic logic structural diagram of an encoder according to Embodiment 8 of the present invention.

Embodiment 8: A vector joint pulse encoder 10. The encoder provided in this embodiment may be used for executing the encoding method provided in Embodiment 1 to Embodiment 4, as shown in FIG. 9, which includes:

an encoding index calculation unit 101, configured to calculate an encoding index $Ind_t$ of each vector, where a subscript t denotes a $t^{th}$ vector, $t \in [0, T-1]$, and T is an integer greater than or equal to 2;

a vector index splitting unit 102, configured to split at least one $Ind_t$ at least once into at least two sections, where splitting at least once is equivalent to splitting the $Ind_t$ into two split indexes $Ind_{t0}$ and $Ind_{t1}$ according to a set factor $SLF_t$, the $SLF_t$ is a positive integer, the $Ind_{t0}$ denotes a serial number of an interval to which the $Ind_t$ belongs, the $Ind_{t1}$ denotes a serial number of the $Ind_t$ in the interval to which the $Ind_t$ belongs, a length of the interval is not greater than the $SLF_t$, and $Ind_t \le Ind_{t0} \times SLF_t + Ind_{t1}$;

an index combination unit 103, configured to combine a split index of at least one vector and split indexes or encoding indexes of other vectors to generate a combined index $Ind_{SLF}$; and an encoding unit 104, configured to perform encoding according to the combined index generated by the index combination unit 103 and other uncombined split indexes split by the vector index splitting unit 102.

Further, the encoding unit 104 may include:

a recombining sub-unit 1041, configured to split the combined index into T1 recombined indexes $Ind_{t0}'$ according to a set value range, in which T1 is less than or equal to the number of vectors generating the combined index, a value range of at least one $Ind_{t0}'$ is greater than a value range of the split index, participating in combination, of the corresponding vector t, and a value range of at least one $Ind_{t0}'$ is less than the value range of the split index, participating in combination, of the corresponding vector t; and an encoding sub-unit 1042, configured to combine each recombined index and an uncombined split index of a corresponding vector respectively and then encode, and if a vector without being allocated a recombined index exists, encode an uncombined split index of the vector.

Figure 10:
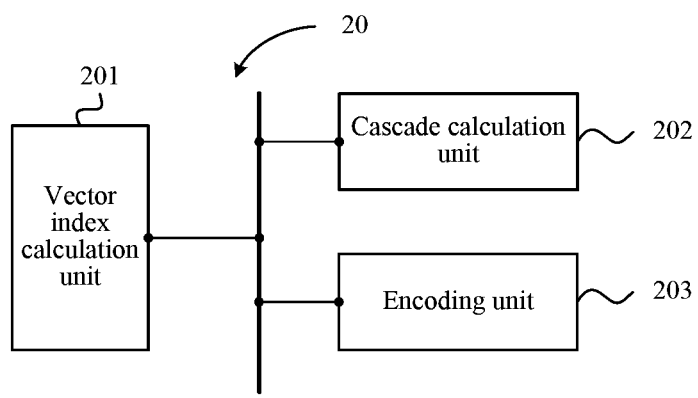
FIG. 10 is a schematic logic structural diagram of an encoder according to Embodiment 9 of the present invention.

Embodiment 9: A vector joint pulse encoder 20. The encoder provided in this embodiment may be used for executing the encoding method provided in Embodiment 5, as shown in FIG. 10, which includes:

a vector index calculation unit 201, configured to group vectors participating in joint encoding, in which each group at least includes two vectors; in each group, calculate an encoding index of each vector; split at least two encoding indexes; split each encoding index at least once into at least two sections, where the splitting at least once is equivalent to splitting an encoding index into two one-stage split indexes according to a set one-stage factor, one one-stage split index denotes serial numbers of several intervals with a length not greater than a set value, the other one-stage split index denotes a serial number of the encoding index in an interval to which the encoding index belongs; and combine one-stage split indexes from at least two vectors to generate a one-stage combined index;

a cascade calculation unit 202, configured to: starting from m=2, repeat the following operation of generating an m-stage combined index until m=M; split at least two (m−1)-stage combined indexes, in which m∈[2, M], M is an integer greater than or equal to 2; split each (m−1)-stage combined index at least once into at least two sections, where splitting at least once is equivalent to splitting an (m−1)-stage combined index into two m-stage split indexes according to a set m-stage factor; and combine m-stage split indexes from at least two (m−1)-stage combined indexes to generate an m-stage combined index; and an encoding unit 203, configured to perform encoding according to the M-stage combined index and other uncombined one-stage to (M−1)-stage split indexes.

During practical implementation, the cascade calculation unit 202 may multiplex a section in the vector index calculation unit 201, in which the section is used for splitting and combining an encoding index.

Figure 11:
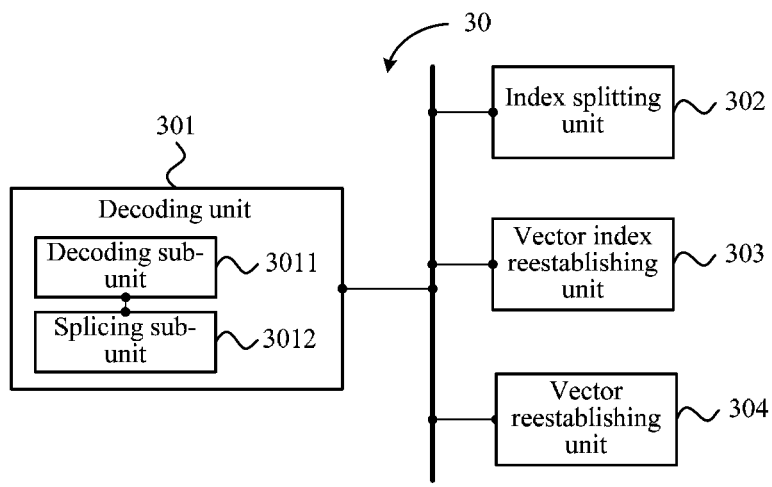
FIG. 11 is a schematic logic structural diagram of a decoder according to Embodiment 10 of the present invention.

Embodiment 10: A vector joint pulse decoder 30. The decoder provided in this embodiment may be used for executing the decoding method of Embodiment 6, as shown in FIG. 11, which includes:

a decoding unit 301, configured to acquire a joint code, and acquire, from the joint code, a combined index and an uncombined split index corresponding to a vector;

an index splitting unit 302, configured to split the combined index acquired by the decoding unit 301 into split indexes corresponding to the vector, or split the combined index into a split index and an encoding index that correspond to the vector;

a vector index reestablishing unit 303, configured to: for each vector participating in splitting the encoding index, splice, according to a split manner of an encoding end, a split index not participating in combination and a split index participating in combination of the vector to generate the encoding index of the vector; and a vector reestablishing unit 304, configured to reestablish the vector according to the encoding index of the vector for each vector.

Further, the decoding unit 301 may include:

a decoding sub-unit 3011, configured to extract, from the joint code, a code corresponding to each vector; split a recombined index and an uncombined split index from the code of each vector; and if a code including no recombined index exists, directly obtain an uncombined split index corresponding to a corresponding vector; and a splicing sub-unit 3012, configured to splice all recombined indexes into a combined index according to the split manner of the encoding end.

Figure 12:
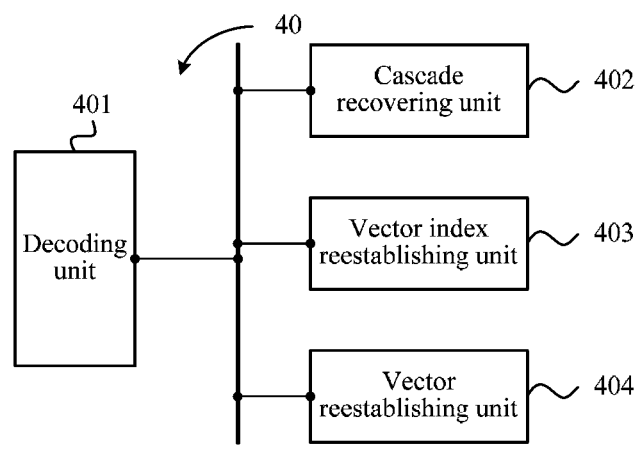
FIG. 12 is a schematic logic structural diagram of a decoder according to Embodiment 11 of the present invention.

Embodiment 11: A vector joint pulse decoder 40. The decoder provided in this embodiment may be used for executing the decoding method of Embodiment 7, as shown in FIG. 12, which includes:

a decoding unit 401, configured to acquire a joint code, and acquire, from the joint code, an M-stage combined index, an uncombined m-stage split index corresponding to each (m−1)-stage combined index, and an uncombined one-stage split index corresponding to each vector, in which M is an integer greater than or equal to 2, and m∈[2, M];

a cascade recovering unit 402, configured to: starting from m=M, repeat the following operation of generating an (m−1)-stage combined index until m=2; split each m-stage combined index into an m-stage split index corresponding to each (m−1)-stage combined index for generating the m-stage combined index; and for each (m−1)-stage combined index, splice, according to a split manner of an encoding end, an m-stage split index not participating in combination and an m-stage split index participating in combination of the (m−1)-stage combined index to generate the (m−1)-stage combined index;

a vector index reestablishing unit 403, configured to split each one-stage combined index into a one-stage split index corresponding to each vector in a vector group for generating the one-stage combined index; and for each vector in each vector group, splice, according to the split manner of the encoding end, a one-stage split index not participating in combination and a one-stage split index participating in combination of the vector to generate an encoding index; and a vector reestablishing unit 404, configured to reestablish the vector according to the encoding index for each vector in each vector group.

During practical implementation, the cascade recovering unit 402 may multiplex a section in the vector index reestablishing unit 403, in which the section is used for splitting and splicing a one-stage combined index.

In order to better understand the present invention, two specific examples based on the track joint encoding of the present invention are provided below.

Figure 13:
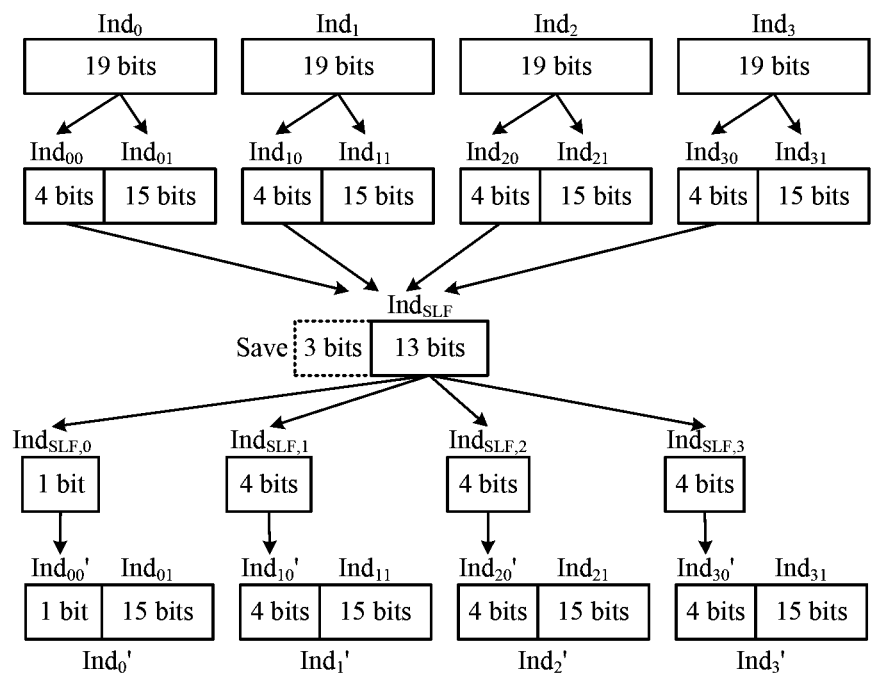
FIG. 13 is a schematic diagram of a 4-track highest-4-bits joint encoding procedure based on an embodiment of the present invention.

Example 1 it is assumed that four tracks participate in joint encoding, and five pulses with symbols are encoded on each track (the number of pulses encoded on each track may also vary). Each track splits a split index participating in combination in a manner of intercepting the highest four bits of an encoding index (the number of bits intercepted by each track may also vary). As shown in FIG. 13, the encoding procedure is as follows:

① Encoding indexes $Ind_0$, $Ind_1$, $Ind_2$, and $Ind_3$ of four tracks are calculated respectively, and if the total number of track positions is 16, the value range of a 5-pulse encoding index is 0 to 285088, and the number of bits needed is 19.

② The highest four bits of each encoding index are intercepted to be used as the split index $Ind_{r0}$ participating in combination, and the remaining 15 bits are used as the split index $Ind_{r1}$ not participating in combination. That is, it is equivalent to that $SLF_r=2^{15}$.

③ $Ind_{00}$, $Ind_{10}$, $Ind_{20}$, and $Ind_{30}$ are combined to generate the combined index $Ind_{SLF}$, and because the number of values of the 5-pulse encoding index is 285088, which is divided by $SLF_r=2^{15}=32768$ to obtain a quotient being 8.7001953125, the value range of $Ind_{r0}$ is 0 to 8, that is, the number of values of $Ind_{r0}$ is 9 (the number of values of $Ind_{r0}$ with another number of pulses may be deduced by analogy, which is not repeated again), and therefore, $$Ind_{SLF}=((Ind_{30}\times 9+Ind_{20})\times 9+Ind_{10})\times 9+Ind_{00}$$

It may be known that the value range of $Ind_{SLF}$ is 0 to 6560, and a bit sequence length is 13.

④ In this case, $Ind_{SLF}$, $Ind_{01}$, $Ind_{11}$, $Ind_{21}$, and $Ind_{31}$ may be directly encoded, a total encoding length is 13+15+15+15+15, and three bits are saved compared with single-track encoding.

Also, $Ind_{SLF}$ may be split, then combined with $Ind_{r1}$ and then encoded, that is, $Ind_{SLF}$ is split with 4 bits as a group (the splitting of the combined index according to the length of the split index participating in combination may intuitively embody the effect of saving bits, and definitely the splitting may also be performed according to other lengths; bits of each recombined index may vary, and bits forming a same recombined index may be unnecessarily continuous, which does not influence the effect of saving bits), $Ind_{30}'$, $Ind_{20}'$, $Ind_{10}'$, and $Ind_{00}'$ are obtained, and apparently, the length of the last recombined index $Ind_{30}'$ is only 1 bit; and then each recombined index is combined with an uncombined split index of a corresponding track, that is, the highest four bits of the encoding index of the corresponding track are replaced with each recombined index to obtain new encoding indexes $Ind_3'$, $Ind_2'$, $Ind_1'$, and $Ind_0'$, and apparently, the length of the new encoding index $Ind_0'$ is only 16 bits, and therefore three bits are fixedly saved.

Example 2

Figure 14:
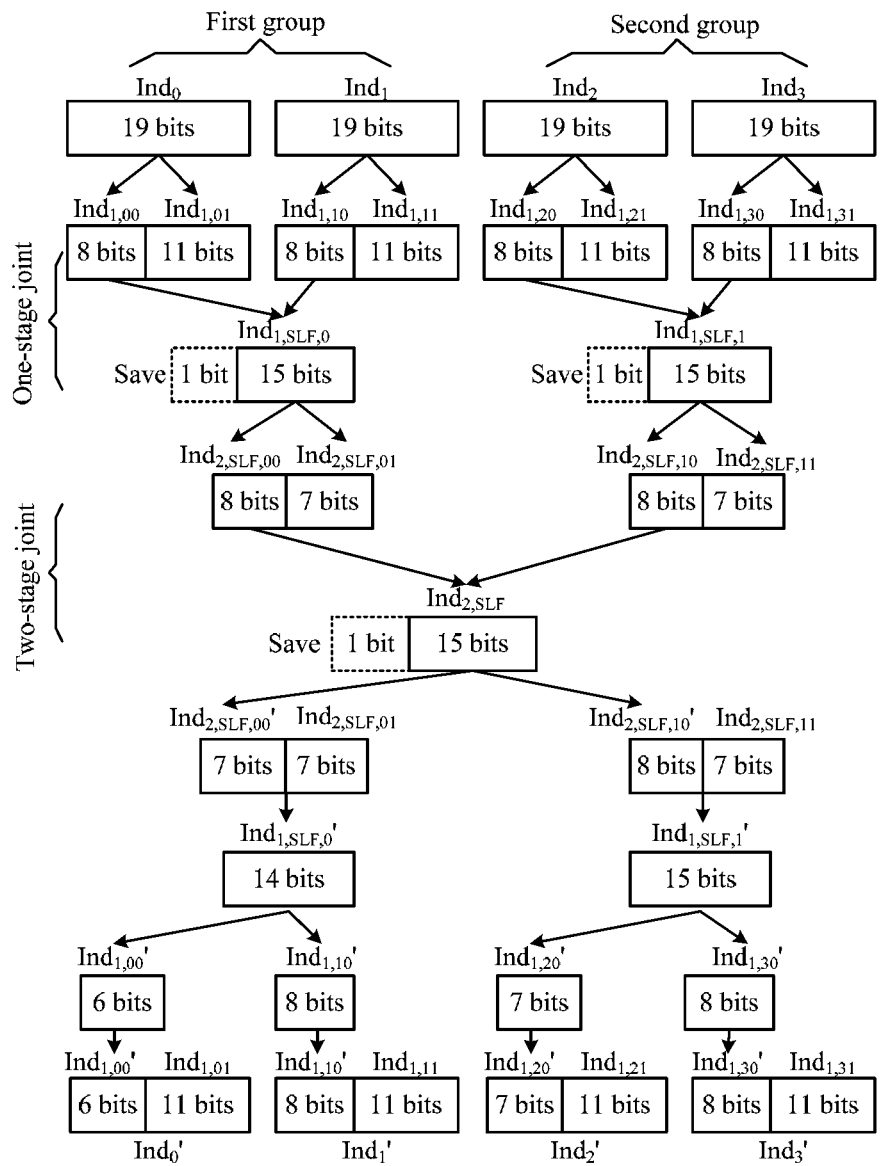
FIG. 14 is a schematic diagram of a 4-track 2-stage-cascade highest-8-bits joint encoding procedure based on an embodiment of the present invention.

It is assumed that four tracks are divided into two groups (two tracks form a group, and the number of tracks included in each group may also vary) to participate in two-stage cascade joint encoding, and five pulses with symbols are encoded on each track (the number of pulses encoded on each track may also vary). Each track splits a split index participating in combination in a manner of intercepting the highest eight bits of an encoding index (the number of bits intercepted by each track may also vary). As shown in FIG. 14, the encoding procedure is as follows:

① Encoding indexes $Ind_0$, $Ind_1$, $Ind_2$, and $Ind_3$ of respective two tracks in two groups are calculated respectively, where, $Ind_0$, and $Ind_1$ are encoding indexes of two tracks of the first group, and $Ind_2$, and $Ind_3$ are encoding indexes of two tracks of the second group; if the total number of track positions is 16, the value range of the 5-pulse encoding index is 0 to 285088, and the number of bits required is 19.

② The highest 8 bits of an encoding index in the first group and the second group are intercepted to be used as a one-stage split index $Ind_{1,r0}$ participating in combination (the first subscript 1 denotes the number of stages, and it is the same below), and remaining 11 bits are used as a one-stage split index $Ind_{1,r1}$ not participating in combination. That is, it is equivalent to that the one-stage factor $SLF_{1,r}=2^{11}$.

③ $Ind_{1,00}$ and $Ind_{1,10}$ are combined to generate a one-stage combined index $Ind_{1,SLF,0}$, and $Ind_{1,20}$ and $Ind_{1,30}$ are combined to generate a one-stage combined index $Ind_{1,SLF,1}$; the number of values of the 5-pulse encoding index is 285088, which is divided by $SLF_r=2^{11}=2048$ to obtain a quotient being 139.203125, so the value range of $Ind_{1,r0}$ is 0 to 139, that is, the number of values of $Ind_{1,r0}$ is 140, and therefore, $$Ind_{1,SLF,0}=Ind_{1,10}\times 140+Ind_{1,00}$$

$$Ind_{1,SLF,1}=Ind_{1,30}\times 140+Ind_{1,20}$$

It may be known that the number of values of the one-stage combined indexes $Ind_{1,SLF,0}$ and $Ind_{1,SLF,1}$ is 19600, and a bit sequence length is 15, and therefore, each one-stage combined index saves one bit, and the one-stage joint encoding saves two bits.

④ The two-stage joint encoding operation continues to be performed based on $Ind_{1,SLF,0}$ and $Ind_{1,SLF,1}$ (when multi-stage joint is performed, a previous stage combined index may be regarded as an encoding index in one-stage joint to be similarly split and combined, and therefore a subscript t is subsequently used continuously to denote a $t^{th}$ previous stage combined index); the highest 8 bits of $Ind_{1,SLF,t}$ are intercepted to be used as a two-stage split index $Ind_{2,SLF,t0}$ participating in combination, and the remaining 7 bits are used as a two-stage split index $Ind_{2,SLF,t1}$ not participating in combination. That is, it is equivalent to that the two-stage factor $SLF_{2,t}=2^{\wedge}7$.

⑤ $Ind_{2,SLF,00}$ and $Ind_{2,SLF,10}$ are combined to generate a two-stage combined index $Ind_{2,SLF}$; because the number of values of $Ind_{1,SLF,t}$ is 19600, which is divided by $SLF_{2,t}=2^{\wedge}7=128$ to obtain a quotient being 153.125, the value range of $Ind_{2,SLF,t0}$ is 0 to 153, that is, the number of values of $Ind_{2,SLF,t0}$ is 154, and therefore, $$Ind_{2,SLF}=Ind_{2,SLF,10}\times 154+Ind_{2,SLF,00}$$

It may be known that, the number of values of the two-stage combined index $Ind_{2,SLF}$ is 23716, and the bit sequence length is 15, so the two-stage joint encoding saves one bit again.

⑥ In this case, $Ind_{2,SLF}$, $Ind_{2,SLF,01}$, $Ind_{2,SLF,11}$, $Ind_{1,01}$, $Ind_{1,11}$, $Ind_{1,21}$, and $Ind_{1,31}$ may be directly encoded, a total encoding length is 15+7+7+11+11+11+11=73, and three bits are saved totally compared with single-track encoding.

Also, $Ind_{2,SLF}$ may be split, then combined with $Ind_{1,SLF,t1}$ and then encoded, that is, $Ind_{2,SLF}$ is split with 8 bits as a group (the splitting of the m-stage combined index according to the length of the m-stage split index participating in combination may intuitively embody the effect of saving bits, and definitely the splitting may also be performed according to other lengths; bits of each recombined index may vary, and bits forming a same recombined index may be unnecessarily continuous, which does not influence the effect of saving bits), $Ind_{2,SLF,10}'$ and $Ind_{2,SLF,00}'$ are obtained, and apparently, the length of the last recombined index $Ind_{2,SLF,00}'$ is only 7 bits; and then each recombined index is combined with an uncombined two-stage split index of a corresponding one-stage combined index, that is, the highest four bits of the corresponding one-stage combined index are replaced with each recombined index to obtain new one-stage combined indexes $Ind_{1,SLF,1}'$ and $Ind_{1,SLF,0}'$, and apparently, the length of the new one-stage combined index $Ind_{1,SLF,0}'$ is only 14 bits.

In this case, $Ind_{1,SLF,1}'$, $Ind_{1,SLF,0}'$, $Ind_{01}$, $Ind_{11}$, $Ind_{21}$, and $Ind_{31}$ may be directly encoded, the total encoding length is 15+14+11+11+11+11=73, and three bits are saved totally compared with single-track encoding.

Also, $Ind_{1,SLF,1}'$ and $Ind_{1,SLF,0}'$ may be split, then combined with $Ind_{1,t1}$ and then encoded, that is, $Ind_{1,SLF,1}'$ is split with 8 bits as a group to obtain $Ind_{1,30}'$ and $Ind_{1,20}'$, and apparently, the length of the recombined index $Ind_{1,20}'$ is only 7 bits; $Ind_{1,SLF,0}'$ is split with 8 bits as a group to obtain $Ind_{1,10}'$ and $Ind_{1,00}'$, and apparently, the length of the recombined index $Ind_{1,00}'$ is only 6 bits, and then, each recombined index is combined with an uncombined one-stage split index of a corresponding encoding index, that is, the highest four bits of the encoding index of the corresponding encoding index are replaced with each recombined index to obtain new encoding indexes $Ind_{3'}$, $Ind_{2'}$, $Ind_{1'}$, and $Ind_{0'}$, and apparently, the length of $Ind_{2'}$ is only 18 bits, the length of $Ind_{0'}$ is only 17 bits, and therefore three bits are fixedly saved.

Table 2 provides a case that during 4-track joint encoding, the highest-four-bit joint encoding saves bits in a case of different number of pulses (pulse with a symbol) on a track, and other cases that a multi-track joint or split index intercepts different bits may be deduced by analogy.

TABLE 2

| Number of pulses on 4 tracks | Lower limit value for single-track encoding bit | Value range | Number of encoding bits | Total number of bits of joint encoding | Number of bits saved |
|---|---|---|---|---|---|
| 3, 3, 3, 3 | 52 | 0~14640 | 14 | 50 | 2 |
| 3, 3, 3, 4 | 55 | 0~14640 | 14 | 53 | 2 |
| 3, 3, 4, 4 | 58 | 0~14640 | 14 | 56 | 2 |
| 3, 4, 4, 4 | 61 | 0~14640 | 14 | 59 | 2 |
| 4, 4, 4, 4 | 64 | 0~14640 | 14 | 62 | 2 |
| 4, 4, 4, 5 | 67 | 0~11978 | 14 | 65 | 2 |
| 4, 4, 5, 5 | 70 | 0~9800 | 14 | 68 | 2 |
| 4, 5, 5, 5 | 73 | 0~8019 | 13 | 70 | 3 |
| 5, 5, 5, 5 | 76 | 0~6560 | 13 | 73 | 3 |
| 5, 5, 5, 6 | 78 | 0~8747 | 14 | 76 | 2 |
| 5, 5, 6, 6 | 80 | 0~11663 | 14 | 78 | 2 |
| 5, 6, 6, 6 | 82 | 0~15551 | 14 | 80 | 2 |
| 6, 6, 6, 6 | 84 | 0~20735 | 15 | 83 | 1 |
| 6, 6, 6, 7 | 86 | 0~24191 | 15 | 85 | 1 |
| 6, 6, 7, 7 | 88 | 0~28223 | 15 | 87 | 1 |
| 6, 7, 7, 7 | 90 | 0~32927 | 16 | 90 | 0 |
| 7, 7, 7, 7 | 92 | 0~38415 | 16 | 92 | 0 |

It may be seen that, encoding bits can be effectively saved by using the joint encoding method of the present invention. The bits saved by using joint encoding may be used for reducing a transmission code rate, and may also be used for the ISF coefficient quantization, the pitch period precision, and the gain of other modules, so as to be used for improving the encoding quality.

For example, the number of pulses on a track may be increased (the number of ACELP excitation code pulses is increased) in a case of an invariable code rate, so as to enhance the encoding quality. For example, several ACELP high-code-rate fixed codebooks for AMR-WB+, after using the highest-four-bit joint encoding shown in Table 2, may be added with several pulses at an original code rate, and details are as follows:

① 3 pulses are added at 18.25 kbps

| | (AMR–WB+) Number of pulses on 4 tracks | bits | | (highest-four-bit joint encoding) Number of pulses on 4 tracks | bits |
|---|---|---|---|---|---|
| 18.25 kbps | 4, 4, 4, 4 | 64 | -> | 4, 5, 5, 5 | 70 |
| | 4, 4, 4, 4 | 64 | | 4, 4, 4, 4 | 62 |
| | 4, 4, 4, 4 | 64 | | 4, 4, 4, 4 | 62 |
| | 4, 4, 4, 4 | 64 | | 4, 4, 4, 4 | 62 |

I. ② 6 Pulses are Added at 19.85 kbps

| | (AMR–WB+) Number of pulses on 4 tracks | bits | | (highest-four-bit joint encoding) Number of pulses on 4 tracks | bits |
|---|---|---|---|---|---|
| 19.85 kbps | 4, 4, 5, 5 | 72 | -> | 5, 5, 5, 5 | 73 |
| | 4, 4, 5, 5 | 72 | | 5, 5, 5, 5 | 73 |
| | 4, 4, 5, 5 | 72 | | 5, 5, 5, 5 | 73 |
| | 4, 4, 5, 5 | 72 | | 4, 4, 5, 5 | 68 |

II. ③ 6 Pulses are Added at 19.85 kbps

| | (AMR-WB+) Number of pulses on 4 tracks | bits | | (highest-four-bit joint encoding) Number of pulses on 4 tracks | bits |
|---|---|---|---|---|---|
| 19.85 kbps | 4, 4, 5, 5 | 72 | -> | 5, 5, 5, 5 | 73 |
| | 4, 4, 5, 5 | 72 | | 5, 5, 5, 5 | 73 |
| | 4, 4, 5, 5 | 72 | | 4, 5, 5, 5 | 70 |
| | 4, 4, 5, 5 | 72 | | 4, 5, 5, 5 | 70 |

III. ④ 7 Pulses are Added at 19.85 kbps

| | (AMR-WB+) Number of pulses on 4 tracks | bits | | (highest-four-bit joint encoding) Number of pulses on 4 tracks | bits |
|---|---|---|---|---|---|
| 19.85 kbps | 4, 4, 5, 5 | 72 | -> | 5, 5, 6, 6 | 78 |
| | 4, 4, 5, 5 | 72 | | 4, 5, 5, 5 | 70 |
| | 4, 4, 5, 5 | 72 | | 4, 5, 5, 5 | 70 |
| | 4, 4, 5, 5 | 72 | | 4, 5, 5, 5 | 70 |

IV. ⑤ 8 Pulses are Added at 23.05 kbps

| | (AMR-WB+) Number of pulses on 4 tracks | bits | | (highest-four-bit joint encoding) Number of pulses on 4 tracks | bits |
|---|---|---|---|---|---|
| 23.05 kbps | 6, 6, 6, 6 | 88 | -> | 7, 7, 7, 7 | 92 |
| | 6, 6, 6, 6 | 88 | | 7, 7, 7, 7 | 92 |
| | 6, 6, 6, 6 | 88 | | 6, 6, 6, 6 | 83 |
| | 6, 6, 6, 6 | 88 | | 6, 6, 6, 6 | 83 |

Persons skilled in the art should understand that all or a part of the steps of the methods according to the embodiments may be implemented by a program instructing relevant hardware. The program may be stored in a computer readable storage medium, and the storage medium may include a read only memory, a random access memory, a magnetic disk, or an optical disk.

A vector joint encoding/decoding method and a vector joint encoder/decoder provided in the embodiments of the present invention are introduced in detail above. Specific embodiments are used for illustrating principles and implementation manners of the present invention. The above descriptions of the embodiments are merely for understanding the method and core ideas of the present invention. Meanwhile, persons skilled in the art may make modifications to specific implementation manners and application ranges according to the idea of the present invention. In conclusion, the content of the specification shall not be regarded as a limitation to the present invention.

What is claimed is:

1. A vector joint encoding method for a voice signal performed by a hardware, comprising:
    calculating an encoding index $Ind_t$ of each vector, wherein the each vector is obtained by dividing the voice signal, wherein a subscript t denotes a $t^{th}$ vector, $t \in [0, T-1]$, and T is the number of vectors and is an integer greater than or equal to 2;
    splitting at least one $Ind_t$ at least once into at least two sections, wherein the splitting at least once is equivalent to splitting the $Ind_t$ into two split indexes $Ind_{t0}$ and $Ind_{t1}$ according to a set factor $SLF_t$, wherein the set factor $SLF_t$ is the set split factor SLF for the $t^{th}$ vector, the $SLF_t$ is a positive integer, the $Ind_{t0}$ denotes a serial number of an interval to which the $Ind_t$ belongs, the $Ind_{t1}$ denotes a serial number of the $Ind_t$ in the interval to which the $Ind_t$ belongs, the length of the interval is not greater than the $SLF_t$, and $$Ind_t \leq Ind_{t0} \times SLF_t + Ind_{t1};$$

combining a split index of at least one vector and split indexes or encoding indexes of other vectors to generate a combined index $Ind_{SLF}$; and
    performing encoding according to the combined index and other uncombined split indexes.

2. The method according to claim 1, wherein the vector is represented as pulse distribution on a track, and the encoding index is an index used for indicating the pulse distribution on the track.

3. The method according to claim 1, wherein the splitting the $Ind_t$ into two split indexes $Ind_{t0}$ and $Ind_{t1}$ according to a set factor $SLF_t$ is specifically:
    $Ind_{t0} = Int(Ind_t/SLF_t)$, wherein Int( ) denotes rounding down to an integer, and
    $Ind_{t1} = Ind_t \% SLF_t$, wherein % denotes taking a remainder.

4. The method according to claim 3, wherein
    $SLF_t = 2^{\wedge}(K_t)$, wherein $K_t$ is a positive integer, and the combining a split index of at least one vector and split indexes or encoding indexes of other vectors to generate a combined index $Ind_{SLF}$ is specifically: for a vector t providing a split index to participate in combination, selecting the $Ind_{t0}$ to participate in combination;
    or,
    $SLF_t = Int(Ind_{t,max}/2^{\wedge}(K_t))$, wherein $Ind_{t,max}$ denotes a maximal value of the $Ind_t$, and the combining a split index of at least one vector and split indexes or encoding indexes of other vectors to generate a combined index $Ind_{SLF}$ is: for the vector t providing a split index to participate in combination, selecting the $Ind_{t1}$ to participate in combination.

5. The method according to claim 4, wherein $K_t = K_{t,max} - 2$, or $K_t = K_{t,max} - 3$, or $K_t = K_{t,max} - 4$, wherein the $K_{t,max}$ is a length of a bit sequence of the $Ind_{t,max}$.

6. The method according to claim 1, wherein the combining a split index of at least one vector and split indexes or encoding indexes of other vectors to generate a combined index $Ind_{SLF}$ is specifically:
    for a vector t providing a split index to participate in combination, selecting a split index capable of embodying space occupancy characteristics of the $Ind_t$ to participate in combination, wherein being capable of embodying space occupancy characteristics of the $Ind_t$ refers to that, compared with other split indexes, an occupancy rate of a value range of a selected split index for an encoding space is the closest to an occupancy rate of a value range of the $Ind_t$ for the encoding space.

7. The method according to claim 1, wherein the splitting the $Ind_t$ into two split indexes $Ind_{t0}$ and $Ind_{t1}$ according to a set factor $SLF_t$ is specifically:
    selecting a value of bits of the $Ind_t$ as the $Ind_{t0}$, the bits being located at a set position, and selecting a value of bits at a remaining position as the $Ind_{t1}$, wherein $SLF_t = 2^{\wedge}(K_t)$, the number of the bits at the set position is $K_{t0}$, the number of the bits at the remaining position is $K_t$, $K_{t0}+K_t=K_{t,max}$, $K_{t,max}$ is a length of a bit sequence of $Ind_{t,max}$, and the $Ind_{t,max}$ denotes a maximal value of the $Ind_t$.

8. The method according to claim 7, wherein combining split indexes from at least two vectors to generate a combined index $Ind_{SLF}$ is specifically:

for a vector t providing a split index to participate in combination, selecting, in a bit sequence with a length being $K_{t,max}$, a split index of the $Ind_t$ to participate in combination, wherein the split index at least comprises a value of the highest two bits.

9. The method according to claim 1, wherein the performing encoding according to the combined index and other uncombined split indexes is:

splitting the combined index into T1 recombined indexes $Ind_{t0}'$ according to a set value range, wherein T1 is less than or equal to the number of vectors generating the combined index, a value range of at least one $Ind_{t0}'$ is greater than a value range of the split index of a corresponding vector t, wherein the split index participates in combination, and a value range of at least one $Ind_{t0}'$ is less than the value range of the split index of the corresponding vector t, wherein the split index participates in combination; and respectively combining each recombined index and an uncombined split index of a corresponding vector and then performing encoding, and if a vector without being allocated a recombined index exists, encoding an uncombined split index of the vector.

10. The method according to claim 9, wherein the splitting the combined index into T1 recombined indexes $Ind_{t0}'$ according to a set value range is specifically:

splitting a total length $K_{SLF}$ of the bit sequence of the combined index into T1 sections according to a set length, wherein a value of each section corresponds to one $Ind_{t0}'$, the $K_{SLF}$ is the length of the bit sequence of an $Ind_{SLF,max}$, and the $Ind_{SLF,max}$ denotes a maximal value of the $Ind_{SLF}$.

11. The method according to claim 10, wherein the splitting the $Ind_t$ into two split indexes $Ind_{t0}$ and $Ind_{t1}$ according to a set factor $SLF_t$ is specifically: in the bit sequence with the length being $K_{t,max}$, selecting a value of $K_{t0}$ bits, starting from the highest bit, of the $Ind_t$, as the $Ind_{t0}$, and selecting a value of remaining bits as the $Ind_{t1}$, wherein $SLF_t=2^{\wedge}(K_t)$, $K_{t0}+K_t=K_{t,max}$, the $K_{t,max}$ is the length of the bit sequence of the $Ind_{t,max}$, and the $Ind_{t,max}$ denotes a maximal value of the $Ind_t$; and the combining a split index of at least one vector and split indexes or encoding indexes of other vectors to generate a combined index $Ind_{SLF}$ is specifically: for a vector t needs to provide a split index, selecting the $Ind_{t0}$ to participate in combination; and the splitting the total length $K_{SLF}$ of the bit sequence of the combined index into T1 sections according to a set length is specifically: splitting the $K_{SLF}$ according to a $K_{t0}$ value used by the vector t generating the combined index, wherein the number of bits split by each $Ind_{t0}'$ correspondingly is less than or equal to the $K_{t0}$ value used by the corresponding vector t.

12. The method according to claim 1, wherein the performing encoding according to the combined index and other uncombined split indexes is:

comparing the combined index $Ind_{SLF}$ and adjusting a threshold value THR, wherein, $THR \leq 2^{\wedge}(K_{SLF})-Ind_{SLF,max}$, the $K_{SLF}$ is the length of the bit sequence of the $Ind_{SLF,max}$, and the $Ind_{SLF,max}$ denotes a maximal value of the $Ind_{SLF}$;

if the $Ind_{SLF}$ is less than the THR, encoding the $Ind_{SLF}$ by using a first number of encoding bits; otherwise, encoding the $Ind_{SLF}$ added with an offset value $THR_0$ by using a second number of encoding bits, wherein $THR \leq THR_0 \leq 2^{\wedge}(K_{SLF})-Ind_{SLF,max}$, the first number is less than the second number, the second number is less than or equal to the $K_{SLF}$, and the first number and the second number are both positive integers; and encoding other uncombined split indexes.

13. A vector joint pulse encoding method for a voice signal performed by a hardware, comprising:

grouping vectors participating in joint encoding, wherein each group at least comprises two vectors;

in each group, calculating an encoding index of each vector, wherein the each vector is obtained by dividing the voice signal; splitting at least two encoding indexes; splitting each encoding index at least once into at least two sections, wherein splitting at least once is equivalent to splitting an encoding index into two one-stage split indexes according to a set one-stage factor, one one-stage split index denotes serial numbers of several intervals with a length not greater than a set value, the other one-stage split index denotes a serial number of the encoding index in an interval to which the encoding index belongs; and combining one-stage split indexes from at least two vectors to generate a one-stage combined index;

starting from m=2, repeating the following operation of generating an m-stage combined index until m=M; splitting at least two (m−1)-stage combined indexes, wherein m∈[2, M], M is an integer greater than or equal to 2; splitting each (m−1)-stage combined index at least once into at least two sections, wherein splitting at least once is equivalent to splitting an (m−1)-stage combined index into two m-stage split indexes according to a set m-stage factor; and combining m-stage split indexes from at least two (m−1)-stage combined indexes to generate an m-stage combined index; and encoding according to the M-stage combined index and other uncombined one-stage to (M−1)-stage split indexes.

14. The method according to claim 13, wherein the one-stage split index used for generating the one-stage combined index is a value intercepted from a set bit of a corresponding encoding index starting from the highest bit; and the m-stage split index used for generating the m-stage combined index is a value intercepted from a set bit of a corresponding (m−1)-stage combined index starting from the highest bit.

15. A vector joint pulse decoding method for a voice signal performed by a hardware, comprising:

acquiring a joint code, and acquiring, from the joint code, a combined index and an uncombined split index corresponding to a vector, wherein the vector is obtained by dividing the voice signal;

splitting the combined index into split indexes corresponding to the vector, or splitting the combined index into a split index and an encoding index that correspond to the vector;

for each vector participating in splitting the encoding index, splicing, according to a split manner of an encoding end, a split index not participating in combination and a split index participating in combination of the vector to generate the encoding index of the vector; and reestablishing the vector according to the encoding index of the vector for each vector.

16. The method according to claim 15, wherein the acquiring, from the joint code, a combined index and an uncombined split index corresponding to each vector is:

extracting, from the joint code, a code corresponding to each vector; splitting a recombined index and an uncombined split index from the code of each vector; and if a code comprising no recombined index exists, directly obtaining an uncombined split index corresponding to a corresponding vector; and splicing all recombined indexes into a combined index according to the split manner of the encoding end.

17. A vector joint pulse decoding method for a voice signal performed by a hardware, comprising:

acquiring a joint code, and acquiring, from the joint code, an M-stage combined index, an uncombined m-stage split index corresponding to each (m−1)-stage combined index, and an uncombined one-stage split index corresponding to each vector, wherein M is an integer greater than or equal to 2, and m∈[2, M], wherein the each vector is obtained by dividing the voice signal;

starting from m=M, repeating the following operation of generating an (m−1)-stage combined index until m=2; splitting each m-stage combined index into an m-stage split index corresponding to each (m−1)-stage combined index for generating the m-stage combined index; and for each (m−1)-stage combined index, splicing, according to a split manner of an encoding end, an m-stage split index not participating in combination and an m-stage split index participating in combination of the (m−1)-stage combined index to generate the (m−1)-stage combined index according to a split manner of an encoding end;

splitting each one-stage combined index into a one-stage split index corresponding to each vector in a vector group for generating the one-stage combined index; and for each vector in each vector group, splicing, according to the split manner of the encoding end, a one-stage split index not participating in combination and a one-stage split index participating in combination of the vector to generate an encoding index; and reestablishing the vector according to the encoding index for each vector in each vector group.

18. A vector joint pulse encoder for encoding a voice signal, comprising:

an encoding index calculation unit, configured to calculate an encoding index $Ind_t$ of each vector, wherein the each vector is obtained by dividing the voice signal, wherein a subscript t denotes a $t^{th}$ vector, t∈[0, T−1], and T is an integer greater than or equal to 2;

a vector index splitting unit, configured to split at least one $Ind_t$ at least once into at least two sections, wherein splitting at least once is equivalent to splitting the $Ind_t$ into two split indexes $Ind_{t0}$ and $Ind_{t1}$ according to a set factor $SLF_t$, wherein the set factor $SLF_t$ is the set split factor SLF for the $t^{th}$ vector, the $SLF_t$ is a positive integer, the $Ind_{t0}$ denotes a serial number of an interval to which the $Ind_t$ belongs, the $Ind_{t1}$ denotes a serial number of the $Ind_t$ in the interval to which the $Ind_t$ belongs, a length of the interval is not greater than the $SLF_t$, and $Ind_t \leq Ind_{t0} \times SLF_t + Ind_{t1}$;

an index combination unit, configured to combine a split index of at least one vector and split indexes or encoding indexes of other vectors to generate a combined index $Ind_{SLF}$; and an encoding unit, configured to perform encoding according to the combined index and other uncombined split indexes.

19. The encoder according to claim 18, wherein the encoding unit comprises:

a recombining sub-unit, configured to split the combined index into T1 recombined indexes $Ind_{t0}'$ according to a set value range, wherein T1 is less than or equal to the number of vectors generating the combined index, a value range of at least one $Ind_{t0}'$ is greater than a value range of the split index, participating in combination, of a corresponding vector t, and a value range of at least one $Ind_{t0}'$ is less than the value range of the split index, participating in combination, of the corresponding vector t; and an encoding sub-unit, configured to combine each recombined index and an uncombined split index of a corresponding vector respectively and then perform encoding, and if a vector without being allocated a recombined index exists, encode an uncombined split index of the vector.

20. A vector joint pulse encoder for encoding a voice signal, comprising:

a vector index calculation unit, configured to group vectors participating in joint encoding, wherein each group at least comprises two vectors; in each group, calculate an encoding index of each vector, wherein the each vector is obtained by dividing the voice signal; split at least two encoding indexes; split each encoding index at least once into at least two sections, wherein splitting at least once is equivalent to splitting an encoding index into two one-stage split indexes according to a set one-stage factor, one one-stage split index denotes serial numbers of several intervals with a length not greater than a set value, the other one-stage split index denotes a serial number of the encoding index in an interval to which the encoding index belongs; and combine one-stage split indexes from at least two vectors to generate a one-stage combined index;

a cascade calculation unit, configured to: starting from m=2, repeat the following operation of generating an m-stage combined index until m=M; split at least two (m−1)-stage combined indexes, wherein m∈[2, M], M is an integer greater than or equal to 2; split each (m−1)-stage combined index at least once into at least two sections, wherein splitting at least once is equivalent to splitting an (m−1)-stage combined index into two m-stage split indexes according to a set m-stage factor; and combine m-stage split indexes from at least two (m−1)-stage combined indexes to generate an m-stage combined index; and an encoding unit, configured to perform encode according to the M-stage combined index and other uncombined one-stage to (M−1)-stage split indexes.

21. A vector joint pulse decoder for decoding a voice signal, comprising:

a decoding unit, configured to acquire a joint code, and acquire, from the joint code, a combined index and an uncombined split index corresponding to a vector, wherein the vector is obtained by dividing the voice signal;

an index splitting unit, configured to split the combined index into split indexes corresponding to the vector, or split the combined index into a split index and an encoding index that correspond to the vector;

a vector index reestablishing unit, configured to: for each vector participating in splitting the encoding index, splice, according to a split manner of an encoding end, a split index not participating in combination and a split index participating in combination of the vector to generate the encoding index of the vector; and a vector reestablishing unit, configured to reestablish the vector according to the encoding index of the vector for each vector.

22. The decoder according to claim 21, wherein the decoding unit comprises:

a decoding sub-unit, configured to extract, from the joint code, a code corresponding to each vector; split a recombined index and an uncombined split index from the code of each vector; and if a code comprising no recombined index exists, directly obtain an uncombined split index corresponding to a corresponding vector; and a splicing sub-unit, configured to splice all recombined indexes into a combined index according to the split manner of the encoding end.

23. A vector joint pulse decoder for decoding a voice signal, comprising:

a decoding unit, configured to acquire a joint code, and acquire, from the joint code, an M-stage combined index, an uncombined m-stage split index corresponding to each (m−1)-stage combined index, and an uncombined one-stage split index corresponding to each vector, wherein the each vector is obtained by dividing the voice signal, wherein M is an integer greater than or equal to 2, and m∈[2, M];

a cascade recovering unit, configured to: starting from m=M, repeat the following operation of generating an (m−1)-stage combined index until m=2; split each m-stage combined index into an m-stage split index corresponding to each (m−1)-stage combined index for generating the m-stage combined index; and for each (m−1)-stage combined index, splice, according to a split manner of an encoding end, an m-stage split index not participating in combination and an m-stage split index participating in combination of the (m−1)-stage combined index to generate the (m−1)-stage combined index;

a vector index reestablishing unit, configured to split each one-stage combined index into a one-stage split index corresponding to each vector in a vector group for generating the one-stage combined index; and for each vector in each vector group, splice, according to the split manner of the encoding end, a one-stage split index not participating in combination and a one-stage split index participating in combination of the vector to generate an encoding index; and a vector reestablishing unit, configured to reestablish the vector according to the encoding index for each vector in each vector group.

* * * * *